(12) United States Patent
Nishi

(10) Patent No.: US 9,244,789 B2
(45) Date of Patent: Jan. 26, 2016

(54) APPARATUS AND METHOD FOR SPECIFYING A FAILURE PART IN A COMMUNICATION NETWORK

(71) Applicant: FUJITSU LIMITED, Kawasaki-shi, Kanagawa (JP)

(72) Inventor: Tetsuya Nishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 152 days.

(21) Appl. No.: 14/135,827

(22) Filed: Dec. 20, 2013

(65) Prior Publication Data

US 2014/0289560 A1 Sep. 25, 2014

(30) Foreign Application Priority Data

Mar. 19, 2013 (JP) .................................. 2013-055976

(51) Int. Cl.
*G06F 11/00* (2006.01)
*G06F 11/22* (2006.01)

(52) U.S. Cl.
CPC ............ *G06F 11/2221* (2013.01); *G06F 11/22* (2013.01); *G06F 11/2205* (2013.01)

(58) Field of Classification Search
CPC .............. G06F 11/22; G06F 11/22005; G06F 11/2221; G06F 11/3003; G06F 11/3006; G06F 11/301; G06F 11/3041
See application file for complete search history.

(56) References Cited

U.S. PATENT DOCUMENTS

| | | | | |
|---|---|---|---|---|
| 5,436,909 A | * | 7/1995 | Dev et al. | 714/4.12 |
| 5,559,955 A | * | 9/1996 | Dev et al. | 714/4.12 |
| 5,751,933 A | * | 5/1998 | Dev et al. | 714/4.12 |
| 2009/0307522 A1 | * | 12/2009 | Olson et al. | 714/4 |
| 2013/0212207 A1 | * | 8/2013 | Ong | 709/213 |
| 2014/0059392 A1 | * | 2/2014 | Ren et al. | 714/47.1 |

FOREIGN PATENT DOCUMENTS

JP          2012-14674          1/2012

* cited by examiner

*Primary Examiner* — Joshua P Lottich
(74) *Attorney, Agent, or Firm* — Staas & Halsey LLP

(57) ABSTRACT

A monitoring device specifies a failure part in a first device group including a plurality of information processing devices and a relay device relaying access of the plurality of information processing devices. The monitoring device includes a determination unit and a test controller. The determination unit determines whether one or more destination addresses of information transmitted from the relay device to outside of the first device group, include an address of a storage device included in a second device group connected to the first device group through the relay device, where the storage device is a destination of access of at least one of the plurality of information processing devices. The test controller causes one of the plurality of information processing devices to execute a communication test with respect to the address of the storage device.

21 Claims, 27 Drawing Sheets

FIG. 7

CONNECTION INFORMATION TABLE (SWITCH C) T1

| PORT | COUNTER DEVICE | PORT OF COUNTER DEVICE |
|---|---|---|
| 1 | ROUTER C | 1 |
| 3 | SWITCH D | 1 |
| 4 | SWITCH E | 1 |
| 7 | SWITCH F | 1 |

FIG. 8

ARP TABLE T2

| VLAN ID | IP ADDRESS | MAC ADDRESS | (VIRTUAL MACHINE NAME/ DEVICE NAME) |
|---|---|---|---|
| 0 | 10.10.110.1 | 00:11:22:44:55:66 | VMa |
| ... | ... | ... | |
| 1 | 10.10.210.1 | 00:11:22:44:66:77 | VMb |
| ... | ... | ... | |
| 2 | 10.25.245.2 | 00:11:22:33:44:55 | VMA2 |
| 2 | 10.25.245.3 | 00:11:22:33:44:66 | VMA3 |
| 2 | 10.25.245.110 | 00:55:22:33:44:66 | STORAGE B |

TRAFFIC TABLE

| VLAN ID | NUMBER OF TRANSMITTED PACKETS |
|---|---|
| 0 | 1000 |
| 1 | 1200 |
| 2 | 50 |
| ... | ... |

FIG. 11

VIRTUAL MACHINE MANAGEMENT TABLE
(CONFIGURATION DATABASE)         T4

| HV ID (DEVICE ID) | IP ADDRESS OF HYPERVISOR | IP ADDRESS OF VIRTUAL MACHINE WHICH IS CONTROLLED BY HYPERVISOR | (VIRTUAL MACHINE NAME) |
|---|---|---|---|
| 3 | 10.25.245.11 | 10.25.100.11 | VMA1 |
| 4 | 10.25.245.12 | 10.25.110.11 | VMB1 |
|   |              | 10.25.120.11 | VMC1 |
| 5 | 10.25.245.13 | 10.25.110.12 | VMB2 |
|   |              | 10.25.120.12 | VMC2 |

FIG. 12

STORAGE MANAGEMENT TABLE         T5
(CONFIGURATION DATABASE)

| STORAGE ID (DEVICE ID) | IP ADDRESS | (STORAGE NAME) |
|---|---|---|
| 10 | 10.25.245.100 | STORAGE A |

FIG. 15

CONNECTION DESTINATION
INFORMATION MANAGEMENT TABLE   T6

| CONNECTION DESTINATION ID | IP ADDRESS OF CONNECTION DESTINATION | (DEVICE NAME) |
|---|---|---|
| 0 | 10.25.245.11 | SERVER DEVICE A |
| 1 | 10.25.245.12 | SERVER DEVICE B |
| 2 | 10.25.245.13 | SERVER DEVICE C |
| ... | ... | |
| m | 10.25.245.100 | STORAGE A |
| ... | ... | |
| n | 10.25.245.110 | STORAGE B |

FIG. 17

STORAGE SEARCH RESULT TABLE  T7

| DESTINATION IP ADDRESS | NEGOTIATION COMMAND RECEPTION RESULT | (VIRTUAL MACHINE NAME/ DEVICE NAME) |
|---|---|---|
| 10.25.245.2 | × | VMA2 |
| 10.25.245.3 | × | VMA3 |
| 10.25.245.110 | ○ | STORAGE B |

FIG. 20

COMMUNICATION GROUP MANAGEMENT TABLE  T8

| DESTINATION IP ADDRESS | RESPONSE TIME (ms) | GROUP ID | (VIRTUAL MACHINE NAME / DEVICE NAME) |
|---|---|---|---|
| 10.25.245.2 | 10 | 0 | VMA2 |
| 10.25.245.3 | 10 | 0 | VMA3 |
| ... | ... | ... | |
| 10.25.245.10 | 10 | 0 | VMA4 |
| 10.25.245.110 | 10 | 0 | STORAGE B |
| 10.25.245.21 | 100 | 1 | VMA5 |
| 10.25.245.22 | 100 | 1 | VMA6 |
| 10.25.245.120 | 100 | 1 | STORAGE C |

FIG. 22

COMMUNICATION RESULT TABLE  T9

| CONNECTION DESTINATION ID | NUMBER OF RECEIVED PACKETS | NUMBER OF LOST PACKETS |
|---|---|---|
| 0 | 10 | 0 |
| 1 | 9 | 1 |
| 2 | 10 | 0 |
| ... | ... | ... |
| m | 10 | 0 |
| ... | ... | ... |
| n | 10 | 0 |

FIG. 23

COMMUNICATION DETERMINATION RESULT TABLE  T10

| CONNECTION DESTINATION ID | COMMUNICATION DETERMINATION RESULT |
|---|---|
| 0 | ○ |
| 1 | × |
| 2 | ○ |
| ... | ... |
| m | ○ |
| ... | ... |
| n | ○ |

FIG. 25

| FLOW OF COMMUNICATION TEST | L1 | L2 | L3 | L4 | L5 | L6 | L7 | L8 | L9 |
|---|---|---|---|---|---|---|---|---|---|
| F1 | ○ | ○ | — | — | — | — | — | — | — |
| F2 | — | × | × | — | — | — | × | × | — |
| F3 | — | — | — | — | — | ○ | — | — | ○ |
| F4 | — | × | × | × | — | — | — | — | — |
| ABNORMALITY SEPARATION JUDGEMENT | ○ | ○ | × | × | ○ | ○ | × | × | ○ |

APPARATUS AND METHOD FOR SPECIFYING A FAILURE PART IN A COMMUNICATION NETWORK

CROSS-REFERENCE TO RELATED APPLICATION

This application is based upon and claims the benefit of priority of the prior Japanese Patent Application No. 2013-055976 filed on Mar. 19, 2013, the entire contents of which are incorporated herein by reference.

FIELD

The embodiments discussed herein are related to an apparatus and method for specifying a failure part in a communication network.

BACKGROUND

Hitherto, networks (for example, an internet protocol (IP) network), such as a cloud system in which hardware resources are over a plurality of data centers, which connect many physical servers executing virtual servers (virtual machines) and a storage to each other, have been known.

In the above-described networks, for example, when a failure occurs due to a breakdown or the like of a link, a physical server, or a storage, the influence of the failure on services which are provided through the network increases with an increase in the number of virtual servers in the network. Accordingly, it is important for a manager of each data center (center) to rapidly specify a broken-down part when detecting the occurrence of a failure in the own center and to evacuate a virtual server to be influenced by moving the virtual server to another physical server to thereby restore the services.

Here, the example depicted in FIG. 30 is exemplified as a method of detecting the occurrence of a failure and specifying a failure part in the center. FIG. 30 is a diagram illustrating an example of a method of detecting the occurrence of a failure and specifying a failure part in a center 101.

As depicted in FIG. 30, the center 101 includes a management device 110, a monitoring device 200, a switch 300, a router 400, a plurality of (e.g., four) server devices 500-1 to 500-4, and a storage 600.

The switch 300 is a device which connects the server devices 500-1 to 500-4 to the storage 600, and retains connection information indicating a connection relationship between the switch 300 and each device connected to the switch 300. The router 400 is a device which is connected to the switch 300 and also connected to another center 102 to relay a command or information such as data which is transferred between the center 101 and another center 102.

Through a local area network (LAN) cable or the like, the server devices 500-1 to 500-4 and the storage 600 are connected to the switch 300, and the switch 300 is connected to the router 400. The management device 110 and the monitoring device 200 are also connected to the switch 300 through a LAN cable or the like.

The server devices 500-1 to 500-4 each include hardware such as a central processing unit (CPU) and a memory to execute one or more virtual machines (VM) 501-1 to 501-4, respectively. The VMs 501-1 to 501-4 are virtual machines which are used for one user.

In addition, in the example depicted in FIG. 30, the VM 501-1 which is executed by the server device 500-1 is a VM for measurement and subjects other server devices 500-2 to 500-4 and the storage 600 to a communication test using a Ping or the like.

The storage 600 is a hardware resource including one or more storage devices such as a hard disk drive (HDD) and is used by the VMs 501-1 to 501-4.

The VMs 501-1 to 501-4 and the storage 600 form a network for a user.

The management device 110 manages the VMs 501-1 to 501-4 which are executed in the center 101. For example, the management device 110 retains information indicating which server device among the server devices 500-1 to 500-4 the VMs 501-1 to 501-4 are accommodated in.

The monitoring device 200 is a device which specifies a failure part caused in the center 101. Specifically, the monitoring device 200 collects, from the switch 300 and the like, topology information of the center 101 in order to specify the failure part, and collects, from the management device 110, information indicating which server device among the server devices 500-1 to 500-4 the VMs 501-1 to 501-4 are accommodated in.

For example, in FIG. 30, the VM 501-1 for measurement executes a communication test on other VMs 501-2 to 501-4 (server devices 500-2 to 500-4) and the storage 600 on the basis of IP addresses in the network for a user (see the arrows F1 to F4).

Hereinafter, a case in which as a result of the communication test, the VM 501-1 for measurement confirms the communication with respect to the server devices 500-2 and 500-4 and the storage 600, but fails to confirm the communication with respect to the server device 500-3 will be assumed. Examples of the case in which the communication fails to be confirmed include a case in which a packet loss or delay is caused due to a Ping. In this case, the monitoring device 200 specifies a failure part using tomography analysis or the like from the acquired topology information and the route (arrow F3 of FIG. 30) to the server device 500-3 which has failed in the Ping.

Upon specifying a port of the server device 500-3 as a failure part, the monitoring device 200 specifies the VM 501-3 as a virtual server which is influenced by the failure on the basis of the information acquired from the management device 110, and specifies a user who is influenced by the failure as a user of the VM 501-3. In addition, the monitoring device 200 outputs, to a display device (not depicted) or the like, information on the failure part, the user who is influenced by the failure, and the VM 501-3 which is a virtual server to be moved to another server device, and moves the VM 501-3 to another server device with respect to the management device 110.

In some cases, a virtual server is moved to the center 101 depicted in FIG. 30 from another center 102 connected through the router 400 by live migration or the like. The live migration means that the virtual server is moved to another server device by the management system of the management device 110 or the like while being operated continuously.

FIG. 31 is a diagram illustrating an example of a case in which a virtual server is moved over two centers 103 and 104. In FIG. 31, since devices having reference numerals and symbols common to those in FIG. 30 have the same configurations as the devices depicted in FIG. 30, the description thereof will be omitted.

As depicted in FIG. 31, a case in which a VM 501-6 which uses a storage 600-2 of the second center 104 is moved from a server device 500-8 of the second center to a server device 500-6 of the first center 103 will be considered (see the arrows (i) and (ii) of FIG. 31). In this case, a VM 501-5 for measurement also confirms communication with respect to the server device 500-6 which accommodates the VM 501-6 moved from the second center 104, and a monitoring device 200-1 specifies a failure part when a failure is detected.

As a related technique, a technique in which in a cluster system including an active device and a standby device, communication results are confirmed through a hypervisor using a disk monitoring function of each of the active device and the standby device is known (for example, see Japanese Laid-open Patent Publication No. 2012-14674). In this technique, when an error message is output from the disk monitoring function through the confirmation of the communication results, communication with the router is confirmed through the hypervisor using a network monitoring function.

SUMMARY

According to an aspect of the invention, an apparatus specifies a failure part in a first device group including a plurality of information processing devices and a relay device relaying access of the plurality of information processing devices. The apparatus includes a determination unit and a test controller. The determination unit determines whether one or more destination addresses of information which is transmitted from the relay device to outside of the first device group include an address of a storage device included in a second device group connected to the first device group through the relay device, where the storage device is a destination of access of at least one of the plurality of information processing devices. The test controller causes one of the plurality of information processing devices to execute a communication test with respect to the address of the storage device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 7 is a diagram illustrating an example of a connection information table retained in a switch, according to a second embodiment;

FIG. 8 is a diagram illustrating an example of an ARP table retained in a router, according to a second embodiment;

FIG. 11 is a diagram illustrating an example of a virtual machine management table retained in a management device, according to a second embodiment;

FIG. 12 is a diagram illustrating an example of a storage management table retained in a management device, according to a second embodiment;

FIG. 15 is a diagram illustrating an example of a connection destination information management table retained in a monitoring device, according to a second embodiment;

FIG. 17 is a diagram illustrating an example of a storage search result table retained in a monitoring device, according to a second embodiment;

FIG. 20 is a diagram illustrating an example of a communication group management table retained in a monitoring device, according to a second embodiment;

FIG. 22 is a diagram illustrating an example of a communication result table retained in a server device, according to a second embodiment;

FIG. 23 is a diagram illustrating an example of a communication determination result table retained in a monitoring device, according to a second embodiment;

FIG. 25 is a diagram illustrating an example of a method of determining a failure part, according to a second embodiment;

DESCRIPTION OF EMBODIMENTS

Figure 31:
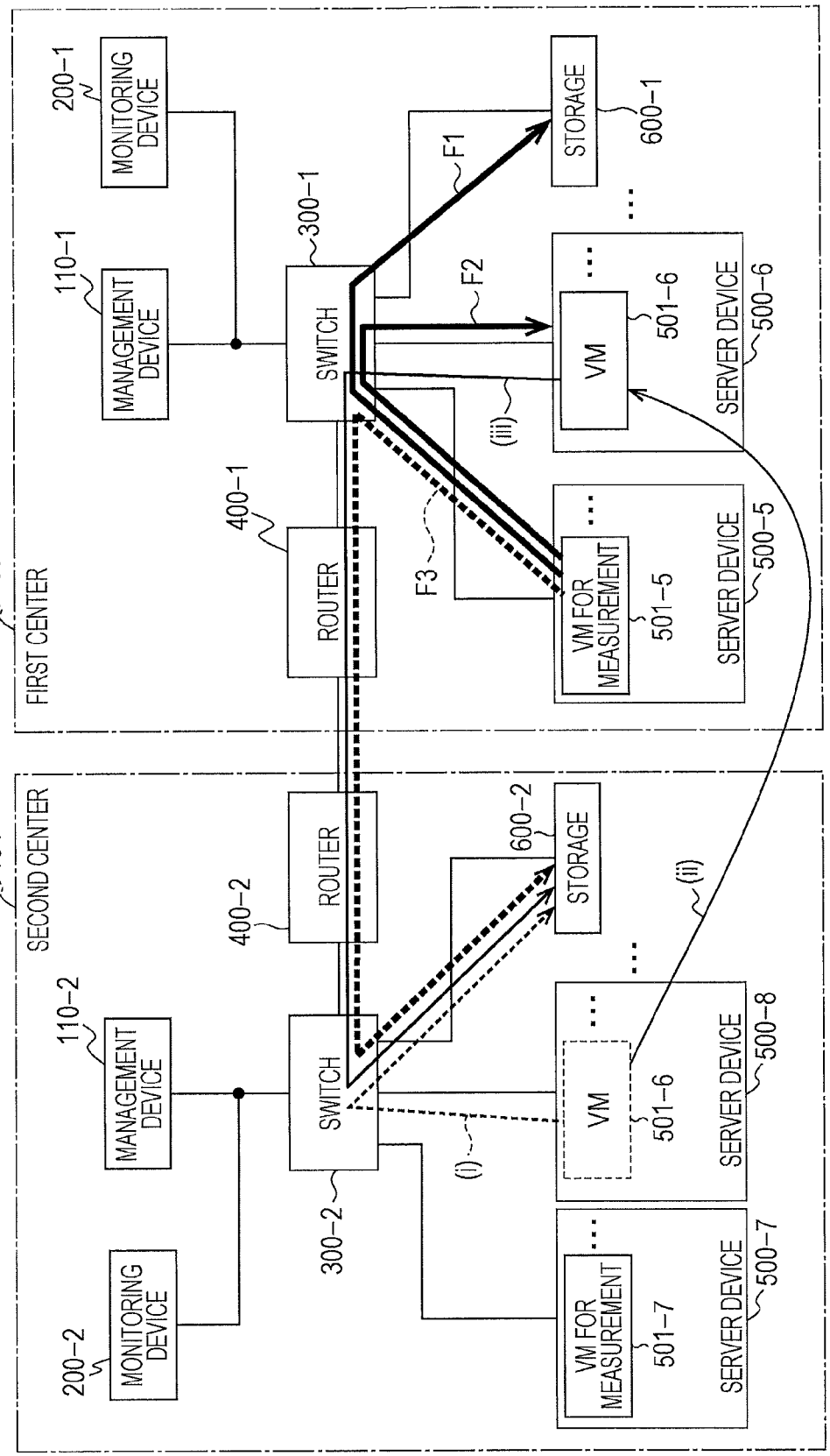
FIG. 31 is a diagram illustrating an example of a case in which movement of a virtual server over two centers is conducted.

In the example depicted in FIG. 31, in some cases, management devices 110-1 and 110-2 do not move (synchronize)

the data in the storage 600-2 which is used by the VM 501-6 to the storage 600-1. The reason for this is that when the management devices 110-1 and 110-2 synchronize the data in the storage 600-2 with the storage 600-1, the storage 600-2 is stopped to maintain the integrity of the data, and thus it is difficult to continuously operate the VM 501-6.

Accordingly, in some cases, the VM 501-6 accesses the storage 600-2 of the second center 104 through a switch 300-1, routers 400-1 and 400-2, and a switch 300-2 after being moved to the first center 103 (see the arrow (iii) of FIG. 31). In such a case, the VM 501-5 for measurement executes a Ping on the storage 600-1 and the server device 500-6 in the first center 103 (the arrows F1 and F2 of FIG. 31).

In addition, the monitoring device 200-1 preferably confirms the communication with respect to the storage 600-2 of the second center 104, which has an influence on the operation of the VM 501-6 of the first center 103, to detect the occurrence of a failure (the arrow F3 of FIG. 31). However, in many cases, the monitoring device 200-1 may not acquire topology information of the second center, etc. from the viewpoint of security, and thus there is a problem in that it is difficult to understand the storage 600-2 which is the measurement destination of a Ping or the like.

The above-described related technique does not consider the above-described problem.

The case in which a virtual server is moved from another center (data center) has been described, but the configuration is not limited thereto. Examples of the center include facilities such as a data center, server racks accommodating devices such as a router, a physical server, and a storage device, and other device groups including these devices. Accordingly, the above-described problem may occur similarly when a virtual server is moved from another device group.

Furthermore, the above-described problem is not limited to the case of moving a virtual server. For example, the above-described problem may occur similarly when a physical machine (server device) itself which uses a storage device of another device group is moved or when a new virtual server or physical machine which uses a storage device of another center is created within the center.

Hereinafter, embodiments will be described with reference to the drawings.

(1) First Embodiment

Figure 1:
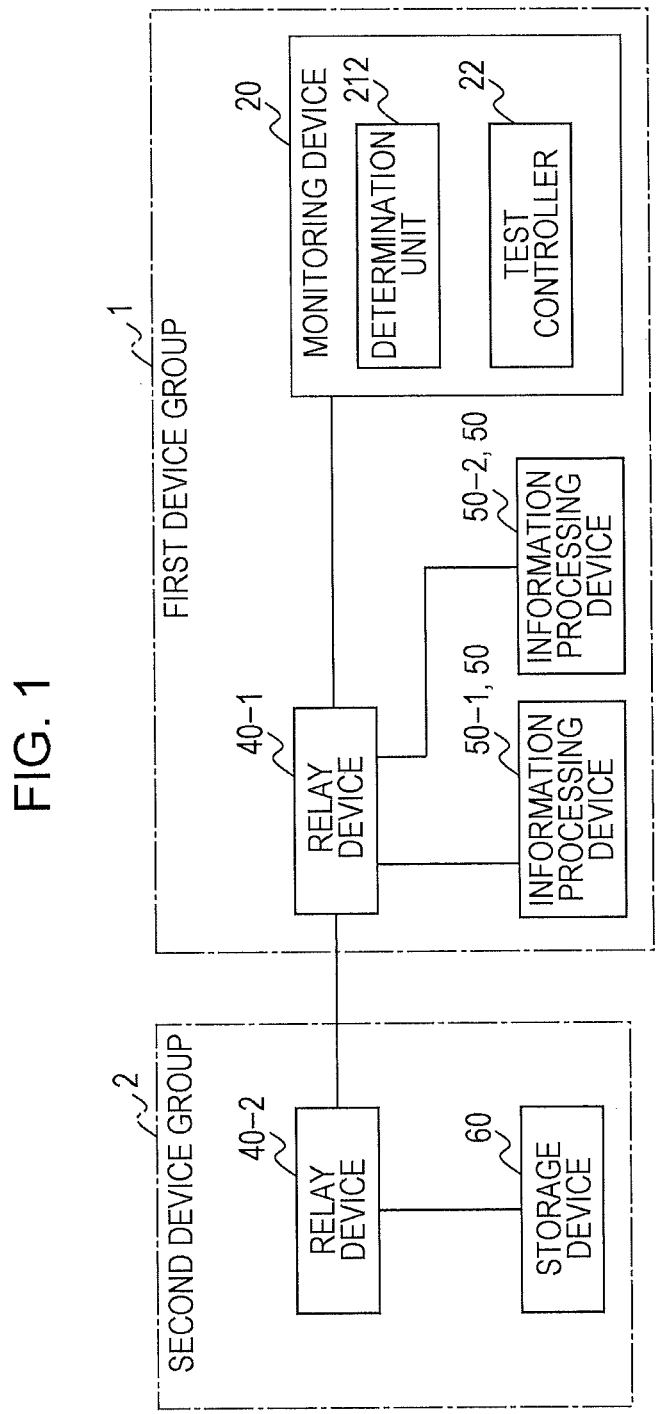
FIG. 1 is a diagram illustrating an example of a configuration of an information processing system, according to a first embodiment.

FIG. 1 is a diagram illustrating an example of a configuration of an information processing system, according to a first embodiment. As depicted in FIG. 1, the information processing system according to the first embodiment includes a first device group 1 and a second device group 2. Examples of the devices groups 1 and 2 include facilities such as a data center, server racks accommodating devices such as a router, a physical server, and a storage device, and other device groups including these devices.

The first device group 1 includes a monitoring device 20, a relay device 40-1, and a plurality of (e.g., two) information processing devices 50-1 and 50-2 (in the following description, simply referred to as the information processing devices 50 when these are not distinguished). The second device group 2 includes a relay device 40-2 and a storage device 60. The device groups 1 and 2 are connected to each other through the relay devices 40-1 and 40-2.

The storage device 60 includes one or more storages such as a HDD and a solid state drive (SSD).

The information processing devices 50-1 and 50-2 are devices which execute a predetermined process in the first device group 1 separately or in cooperation with each other.

At least one information processing device 50 of the information processing devices 50-1 and 50-2 accesses the storage device 60 of the second device group 2.

The relay device 40-1 relays access of the information processing device 50 to the second device group 2, and the relay device 40-2 relays access from the information processing device 50 to the storage device 60.

The monitoring device 20 is a device which specifies a failure part in the first device group 1 and includes a determination unit 212 and a test controller 22.

The determination unit 212 determines whether one or more destination addresses of information which is transmitted from the relay device 40-1 to the outside of the first device group 1 include an address of the storage device 60 which is a destination of the access of the information processing device 50.

The test controller 22 causes any one information processing device 50 of the information processing devices 50-1 and 50-2 to execute a communication test with respect to the address of the storage device 60 subjected to the determination of the determination unit 212.

For example, when the information processing device 50 accesses the storage device 60, destination addresses of information which is transmitted from the relay device 40-1 to the outside of the first device group 1 may include the address of the storage device 60. Therefore, the monitoring device 20 according to the first embodiment determines whether the destination addresses of information which is transmitted to the outside of the first device group 1 include the address of the storage device 60 using a method to be described later. When the address of the storage device 60 is included, the monitoring device 20 causes the one information processing device 50 to execute a communication test with respect to the address of the storage device 60. Accordingly, in the first device group 1, the monitoring device 20 is able to also monitor the storage device 60 of the second device group 2 which has an influence on the operation of the first device group 1.

(2) Second Embodiment (2-1) Description of Information Processing System

Hereinafter, a specific example of the above-described information processing system depicted in FIG. 1 will be described.

Figure 2:
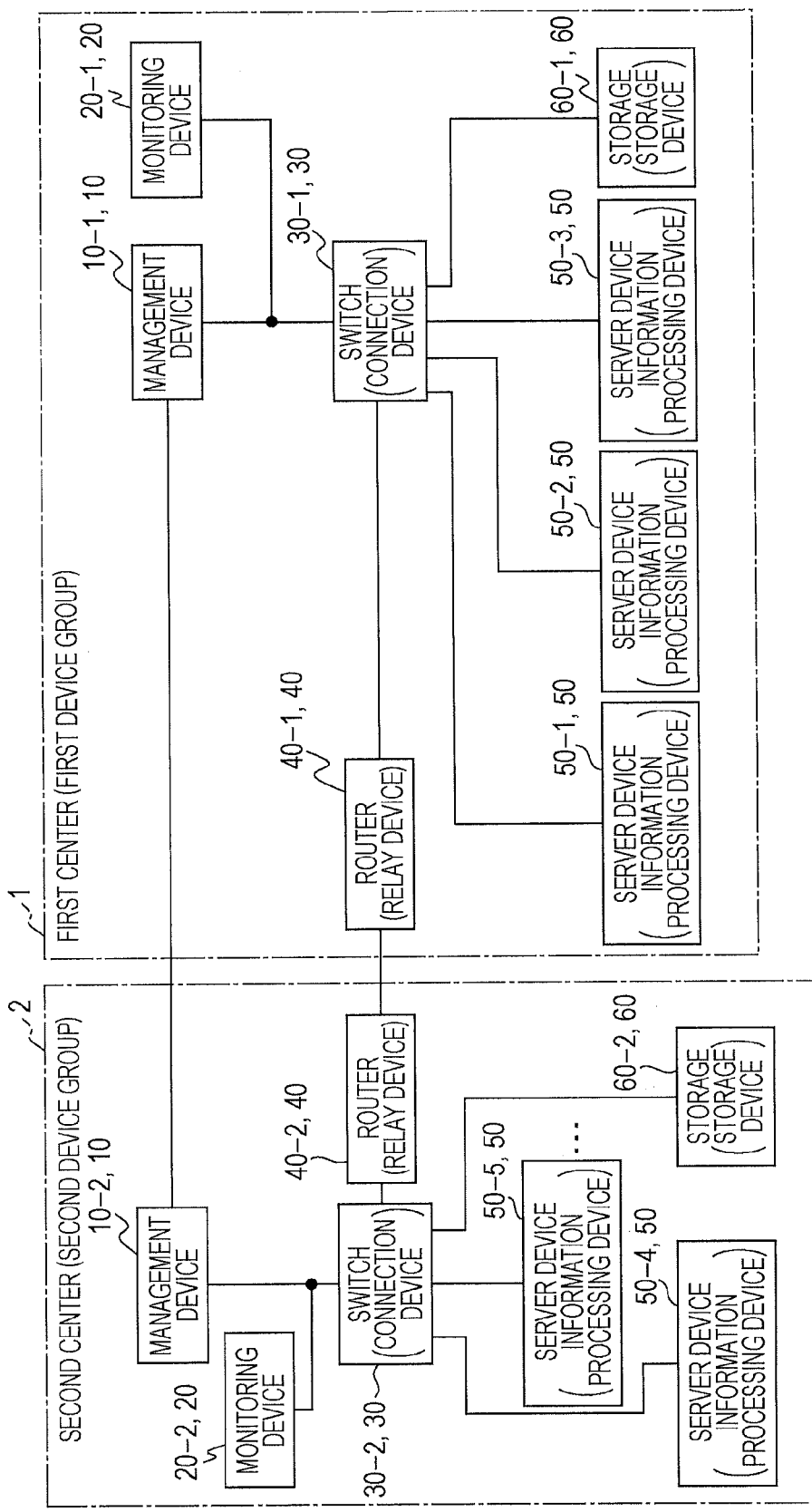
FIG. 2 is a diagram illustrating an example of a configuration of an information processing system, according to a second embodiment.

FIG. 2 is a diagram illustrating an example of a configuration of an information processing system, according to a second embodiment.

As depicted in FIG. 2, the information processing system according to the second embodiment includes a first center 1 and a second center 2 as an example of the device groups 1 and 2 depicted in FIG. 1.

The first center (first device group) 1 includes a management device 10-1, a monitoring device 20-1, a switch 30-1, a router 40-1, a plurality of (e.g., three) server devices 50-1 to 50-3, and a storage 60-1. The second center (second device group) 2 includes a management device 10-2, a monitoring device 20-2, a switch 30-2, a router 40-2, a plurality of (e.g., two) server devices 50-4 and 50-5, and a storage 60-2.

The management devices 10-1 and 10-2 may have the same configuration, the monitoring devices 20-1 and 20-2 may have the same configuration, and the switches 30-1 and 30-2 may have the same configuration. In addition, the routers 40-1 and 40-2 may have the same configuration, the server devices 50-1 to 50-5 may have the same configuration, and the storages 60-1 and 60-2 may have the same configuration. In the following description, the symbol "-" and subsequent reference numeral will be omitted when a plurality of devices having the same configuration are not distinguished. For example, the management devices 10-1 and 10-2 will be expressed as the management devices 10 when these are not distinguished.

Examples of the first center 1 and the second center 2 include facilities such as a data center, server racks accommodating devices such as a router, a physical server, and a storage device, and other device groups including these devices as in the first embodiment. For example, each of the plurality of centers of the information processing system may be a data center, a server rack, or a device group which is connected via the router 40 in the same data center or server rack. Hereinafter, the description will be made on the assumption that each of the plurality of centers of the information processing system is a data center.

(2-2) Hardware Configuration

Figure 3:
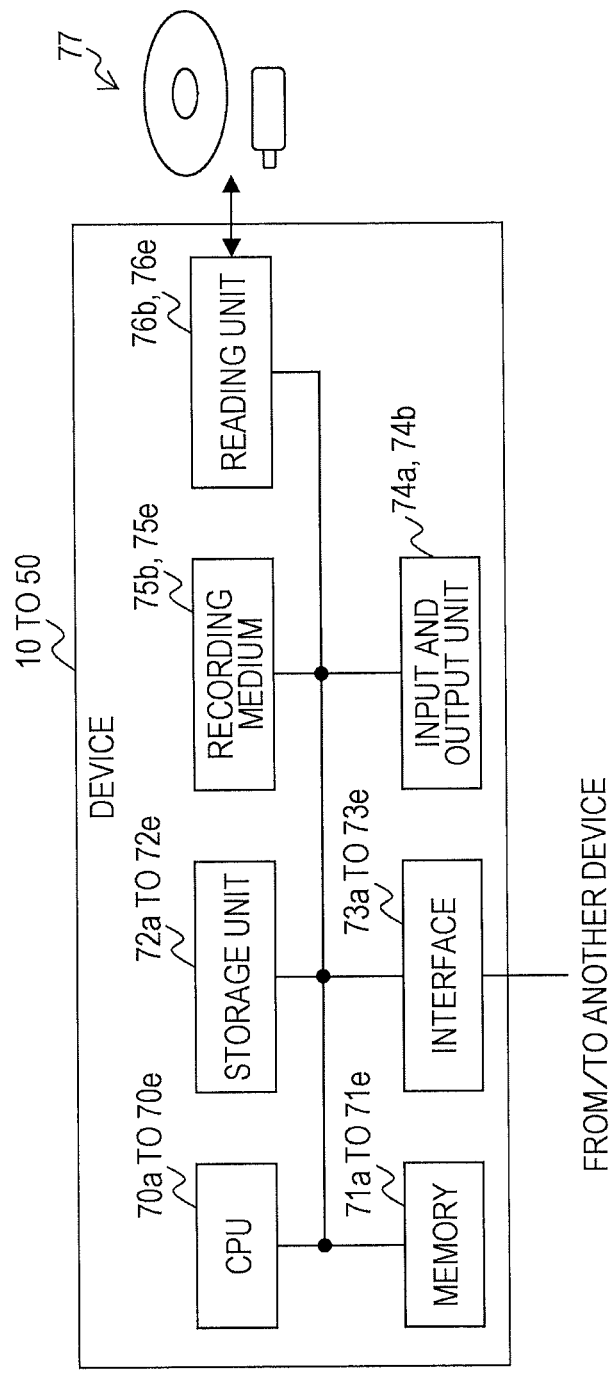
FIG. 3 is a diagram illustrating an example of a hardware configuration of a server device, a monitoring device, a management device, a switch, and a router in an information processing system, according to an embodiment.
Figure 4:
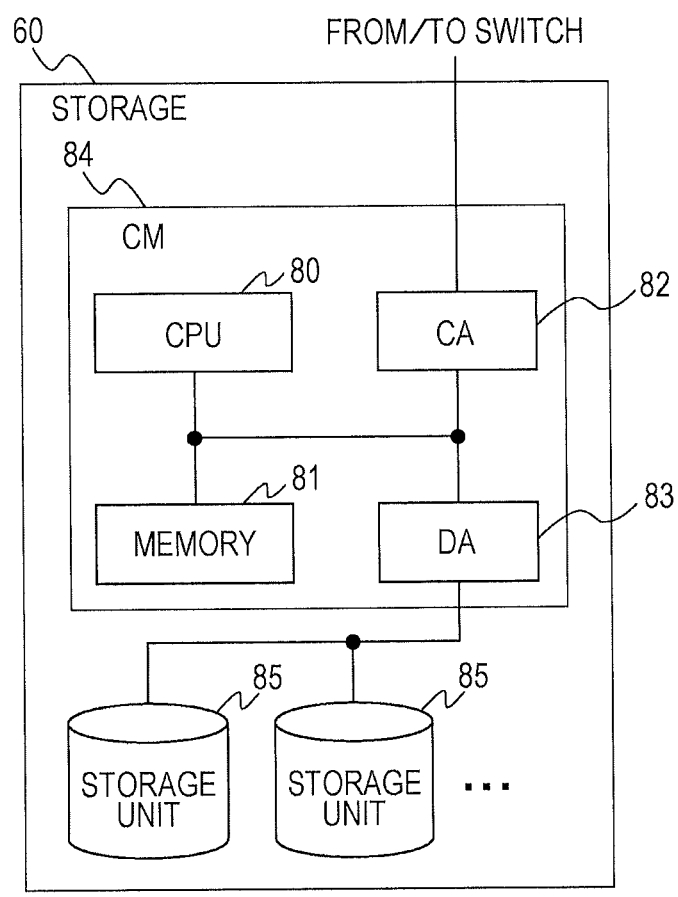
FIG. 4 is a diagram illustrating an example of a hardware configuration of a storage in an information processing system, according to an embodiment.

Next, an example of a hardware configuration of each of the devices 10 to 60 will be described with reference to FIGS. 3 and 4. FIG. 3 is a diagram illustrating an example of a hardware configuration of the management device 10, the monitoring device 20, the switch 30, the router 40, and the server device 50 in the information processing system depicted in FIG. 2. FIG. 4 is a diagram illustrating an example of a hardware configuration of the storage 60 in the information processing system depicted in FIG. 2.

As depicted in FIG. 3, the management device 10, the monitoring device 20, the switch 30, the router 40, and the server device 50 include CPUs 70a to 70e, memories 71a to 71e, storage units 72a to 72e, and interfaces 73a to 73e. In addition, the monitoring device 20 further includes an input and output unit 74b, a recording medium 75b, and a reading unit 76b. The server device 50 further includes a recording medium 75e and a reading unit 76e. Regarding the alphabet which is added to the end of the reference numeral of each hardware, "a" corresponds to the management device 10, "b" corresponds to the monitoring device 20, "c" corresponds to the switch 30, "d" corresponds to the router 40, and "e" corresponds to the server device 50. For example, the management device 10 includes the CPU 70a, the memory 71a, the storage unit 72a, the interface 73a, and the input and output unit 74a.

As depicted in FIG. 4, the storage 60 includes a controller module (CM) 84 and a plurality of storage units 85. In addition, the CM 84 includes a CPU 80, a memory 81, a channel adapter (CA) 82, and a device adapter (DA) 83.

The respective CPUs 70a to 70e are processing devices (processors) which are connected to the corresponding memories 71a to 71e, storage units 72a to 72e, and interfaces 73a to 73e to perform various controls and calculations. In addition, the CPU 80 is a processing device (processor) which is connected to the memory 81, the CA 82, and the DA 83 to perform various controls and calculations. The CPU 70b of the monitoring device 20 is further connected to the input and output unit 74b, the recording medium 75b, and the reading unit 76b. The CPU 70e of the server device 50 is further connected to the recording medium 75e and the reading unit 76e. The CPUs 70a to 70e and 80 execute programs which are stored in the memories 71a to 71e and 81, the recording mediums 75b and 75e, a read only memory (ROM) (not depicted) and the like to realize various functions of the devices 10 to 60. The processors are not limited to the CPUs 70a to 70e and 80. An integrated circuit such as an application specific integrated circuit (ASIC) or a field programmable gate array (FPGA), or an electronic circuit such as a micro processing unit (MPU) may be used as a processor.

The memories 71a to 71e and 81 are storage devices which temporarily store various data and programs, and temporarily store and deploy data and programs when the CPUs 70a to 70e and 80 execute a program. Examples of the memories 71a to 71e and 80 include a volatile memory such as a random access memory (RAM).

Examples of the storage units 72a to 72e and 85 include various devices such as a magnetic disk device such as a HDD, a semiconductor drive device such as a SSD, and a non-volatile memory such as a flash memory, and are hardware storing various data and programs.

The interfaces 73a to 73e are controllers which control the connection and communication between the devices 10 to 60 in a wired or wireless manner. The CA 82 is an adapter which is connected to the server device 50 as a host device through the switch 30 to perform interface control of the server device 50, and performs data communication with the server device 50. The DA 83 performs interface control of the plurality of storage units 85 accommodated in the storage 60 to perform data communication with the plurality of storage units 85.

The input and output units 74a and 74b include, for example, at least one of an input device such as a mouse and a keyboard and an output device such as a display and a printer. The input and output units 74a and 74b receive an operation command issued through an operation or the like of an operator (monitor) of the management device 10 and the monitoring device 20 using the input device, and display (output), on the output device, the processing results such as results of monitoring by the management device 10 and the monitoring device 20.

The recording mediums 75b and 75e are storage devices such as a flash memory and a ROM, and record various data and programs. The reading units 76b and 76e are devices which read out the data and programs recorded in a computer-readable recording medium 77 such as an optical disc and a USB memory.

A monitoring program which realizes the functions of the monitoring device 20 and the server device 50 according to the second embodiment may be stored in at least one of the recording mediums 75b, 75e, and 77. For example, the CPU 70b (and 70e) deploys and executes a monitoring program input from the recording medium 75b (and 75e) or the recording medium 77 through the reading device 76b (and 76e) in the storage device such as the memory 71b (and 71e). Accordingly, the CPU 70b (and 70e) realizes the function of the monitoring device 20 (and the server device 50).

The above-described pieces of hardware are connected to each other to be able to communicate with each other via a bus.

In addition, the devices 10 to 60, that is, the server device 50 and storage 60 and the switch 30, the switch 30 and the router 40, and the management device 10 and monitoring device 20 and the switch 30 may be connected in any mode of wired connection through a cable and wireless connection, respectively. Examples of the cable for wired connection include cables such as a LAN cable and InfiniBand (registered trade name), fiber cables such as a fibre channel, and serial cables such as a universal serial bus (USB) cable. A parallel cable may also be used as the cable. Examples of the wireless connection include wireless LAN, Bluetooth (registered trade name), and wireless USB. The connection between the devices 10 to 60 is not limited to the above-described examples, and these may be connected in various modes.

The first center 1 and the second center 2 may be connected to each other in the same manner as in the case of the above-described devices 10 to 60. When the first center 1 and the second center 2 are separated from each other, the first center 1 and the second center 2 may be connected through a network using a dedicated line or a public line such as the Internet.

The above-described hardware configuration of the devices 10 to 60 is just an example. Accordingly, increasing or decreasing the number of pieces of hardware and dividing the pieces of hardware in the respective devices 10 to 60, unification through arbitrary combination of the devices 10 to 60, and the like may be appropriately performed.

(2-3) Configuration of Each Device

Figure 5:
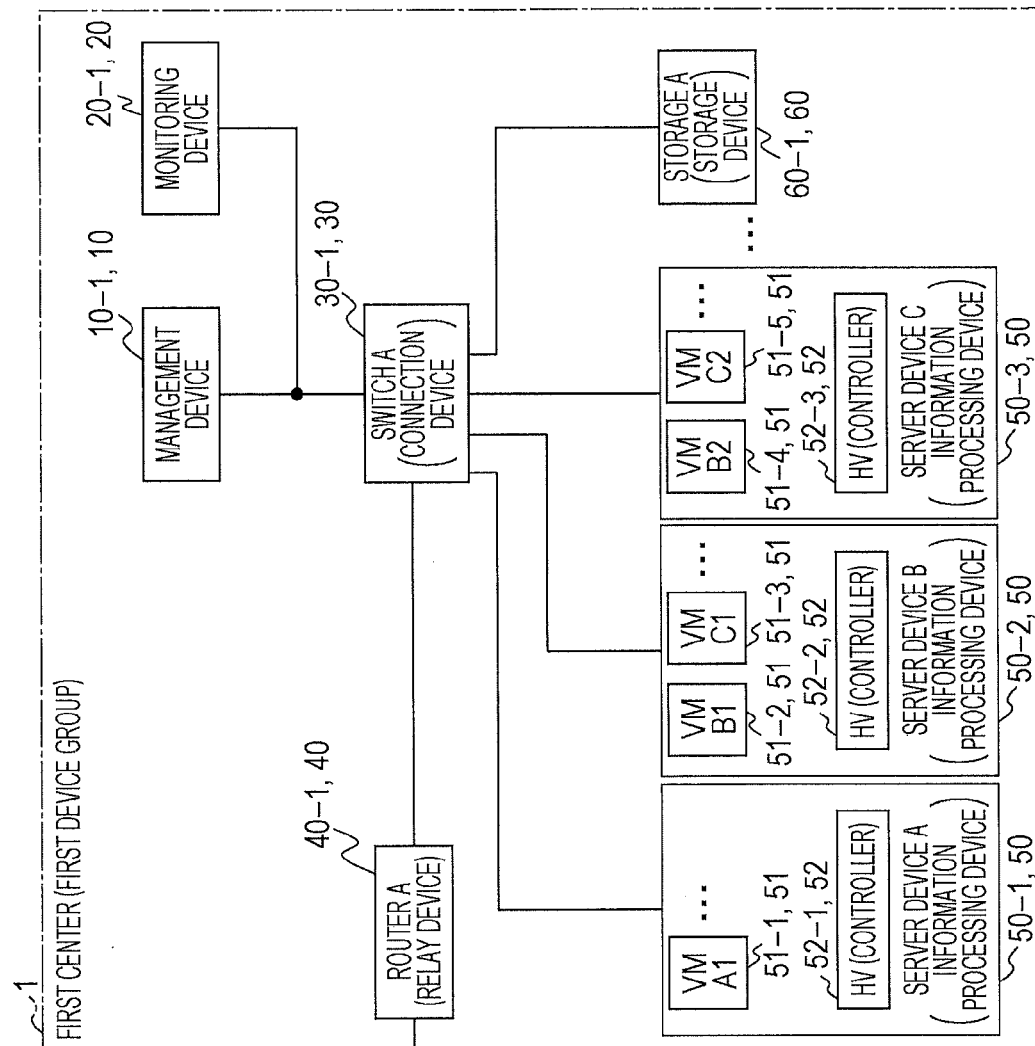
FIG. 5 is a diagram illustrating server devices of an information processing system, according to an embodiment.

Next, an example of the configurations of the management device 10, the monitoring device 20, the switch 30, the router 40, the server device 50, and the storage 60 according to the second embodiment will be described. FIG. 5 is a diagram illustrating the server device 50 of the information processing system depicted in FIG. 2.

Hereinafter, the description will be made on the assumption that the server devices (physical servers) 50-1 to 50-3 of the first center 1 according to the second embodiment execute VMs 51-1 to 51-5 and hypervisors (HVs) 52-1 to 52-3 as depicted in FIG. 5. In addition, the description will be made on the assumption that the server devices (physical servers) 50-4 and 50-5 of the second center 2 execute VMs 51-6 and 51-7 and HVs (omitted) as depicted in FIG. 5. In the following description, the VMs 51-1 to 51-7 will be simply expressed as the VMs 51 when these are not distinguished. The HVs 52-1 to 52-3 will be simply expressed as the HVs 52 when these are not distinguished.

The VMs 51-1, 51-6, and 51-7 which are executed by the server devices 50-1, 50-4, and 50-5, respectively, are virtual machines which are used by a user A. The VMs 51-2 and 51-4 which are executed by the server devices 50-2 and 50-3, respectively, are virtual machines which are used by a user B. In addition, the VMs 51-3 and 51-5 which are executed by the server devices 50-2 and 50-3, respectively, are virtual machines which are used by a user C. The users A to C are people who receive services from a service provider using the information processing system.

Hereinafter, as depicted in FIG. 5, the VMs 51-1 to 51-7 may be expressed as a VMA1, a VMB1, a VMC1, a VMB2, a VMC2, a VMA2, and a VMA3, respectively. In addition, hereinafter, as depicted in FIG. 5, the switches 30-1 and 30-2 may be expressed as switches A and B, respectively, and the routers 40-1 and 40-2 may be expressed as routers A and B, respectively. Furthermore, as depicted in FIG. 5, the server devices 50-1 to 50-5 may be expressed as server devices A to E, respectively, and the storages 60-1 and 60-2 may be expressed as storages A and B, respectively.

Here, the information processing system according to the second embodiment may be a cloud system in which hardware resources are over a plurality of centers.

In some cases, in the network such as a cloud system, a virtual network is formed for each group of users using one or more VMs 51 and storages 60. Examples of the virtual network include virtual LAN (VLAN) and virtual private network (VPN). In the virtual network, one or more VMs 51 and storages 60 belong to a common subnet, and the VM 51 is able to access the VM 51 or the storage 60 of the own center or another center within the common subnet.

Hereinafter, the description will be made on the assumption that a VLAN as an example of a virtual network is formed for each user using one or more VMs 51 and storages 60.

The following description of the devices 10 to 60 may also be similarly applied to the devices 10 to 60 of any of the first center 1 and the second center 2.

The switch (connection device) 30 is connected to the management device 10, the monitoring device 20, the router 40, the server device 50, and the storage 60 to relay a command or information such as data which is transferred between the devices connected to the switch 30. In addition, the switch 30 includes a plurality of ports as an example of the interface 73c (see FIG. 3) to manage information of the devices connected to the ports. For example, the switch 30 retains connection information indicating connection relationships between the ports and the devices 10 to 60 connected to the ports.

Figure 6:
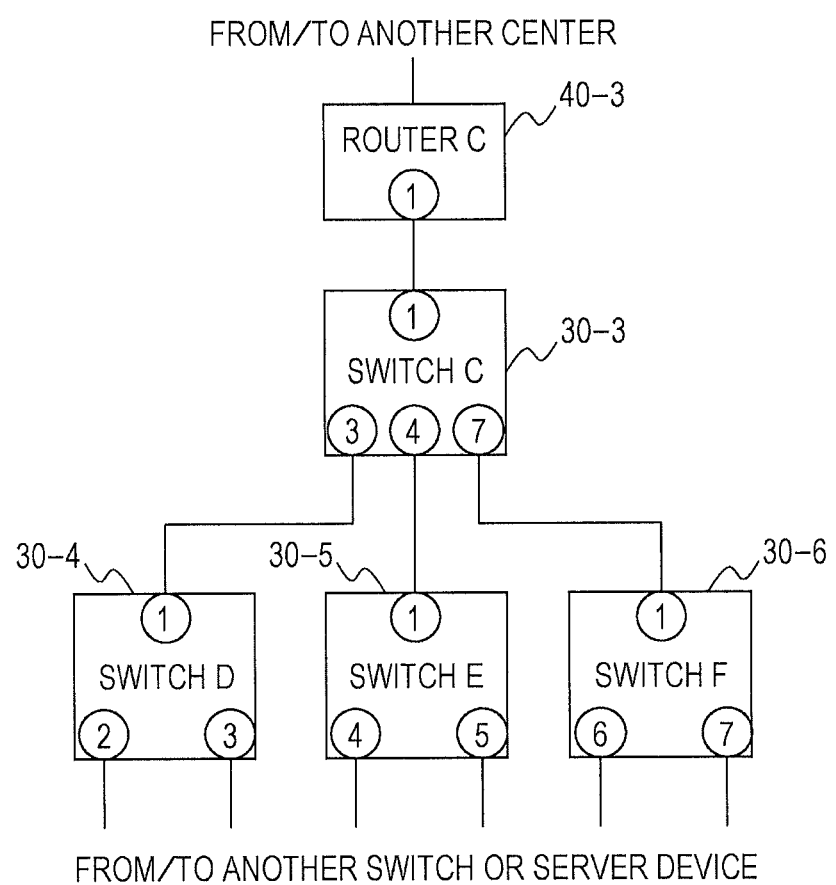
FIG. 6 is a diagram illustrating an example of a connection form of a switch, according to a second embodiment.

Here, the connection information retained in the switch 30 will be described with reference to FIGS. 6 and 7. FIG. 6 is a diagram illustrating an example of a connection form of the switch 30 according to the second embodiment, and FIG. 7 is a diagram illustrating an example of a connection information table T1 retained in the switch 30.

For the sake of convenience, a case in which the first center 1 includes a router 40-3, a switch 30-3 connected to the router 40-3, and switches 30-4 to 30-6 connected to the switch 30-3 as depicted in FIG. 6 will be described as an example. The router 40-3 has the same configuration as the router 40 depicted in FIG. 2, and switches 30-3 to 30-6 have the same configuration as the switch 30 depicted in FIG. 2. Hereinafter, the switches 30-3 to 30-6 may be expressed as switches C to F, respectively, and the router 40-3 may be expressed as a router C as depicted in FIG. 6. In the example depicted in FIG. 6, the number surrounded by a circle represents a port number of each device.

As depicted in FIG. 6, when the switches 30 are connected in multi-stages, the switch C is configured to generate and retain, as an example of the connection information, the connection information table T1 depicted in FIG. 7.

The connection information table T1 retained in the switch C is information in which a port number of the switch C, a device name as an example of information indicating a counter device connected to the port, and a port number of the counter device are associated with each other. For example, the connection information table T1 includes information in which a port number "1" of the switch C is associated with the router C which is a counter device and a port number "1" of the router C.

Each switch 30 generates the above-described connection information table T1 with respect to the ports thereof using a processor such as the CPU 70c, and is able to store the table in the memory 71c, the storage unit 72c, or the like.

The switches 30 may relay information through switching by hardware such as a processor as an integrated circuit and the interface 73c.

The router (relay device) 40 is a device which is connected to the switch 30 and other centers to relay a command or information such as data which is transferred between the first center 1 and the second center 2. For example, the router 40 relays access to another center by the plurality of server devices 50 in the own center. Examples of the router 40 include various relay devices such as software routers which relay information through software and hardware routers such as a Layer 3 (L3) switch which relay information through a hardware process.

In addition, in a virtual network such as a VLAN or a VPN, the router 40 according to the second embodiment is configured to relay information over the first center 1 and the second center 2. That is, by forming one or more VLANs, the routers 40-1 and 40-2 is able to relay information between the first center 1 and the second center 2 connected using one or more VLANs.

Figures 9, 10:
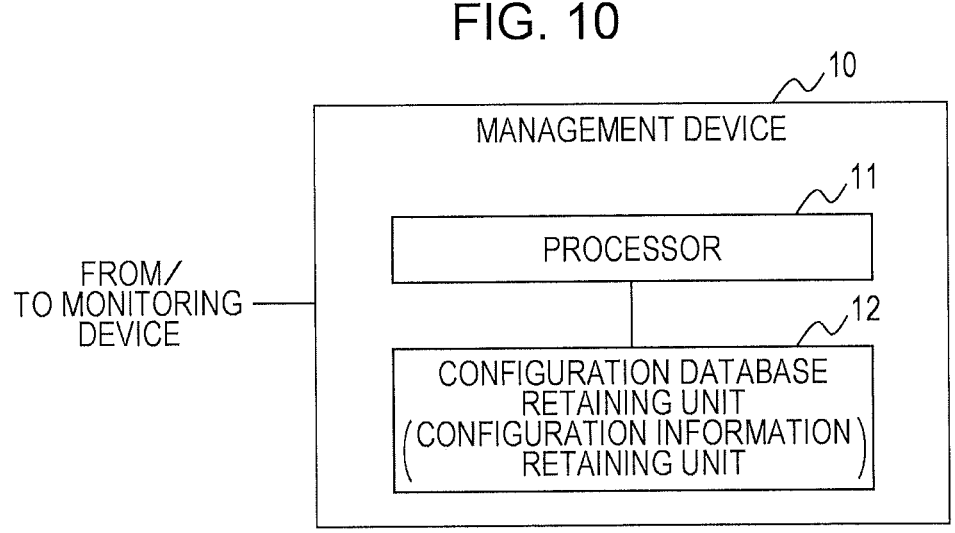
FIG. 9 is a diagram illustrating an example of a traffic table retained in a router, according to a second embodiment.
FIG. 10 is a diagram illustrating an example of a configuration of a management device, according to a second embodiment.

The router 40 relays information between the first center 1 and the second center 2 by using an address resolution protocol (ARP) table T2 and a traffic table T3 depicted in FIGS. 8 and 9, respectively. FIGS. 8 and 9 are diagrams illustrating examples of the ARP table T2 and the traffic table T3, respectively, which are retained in the router 40 according to the second embodiment.

The ARP table T2 is related to virtual machines or devices connected to the outside of the router 40, and is information for managing addresses designated in the VLANs and addresses (for example, media access control (MAC) addresses) specifying the devices. Specifically, the ARP table T2 is information in which a VLAN ID as an example of information specifying a VLAN, an IP address of a virtual machine or a device connected to the outside of the router 40, and a MAC address as an example of information specifying a device are associated with each other (see FIG. 8).

For example, the ARP table T2 retained in the router A includes information in which a VLAN ID "2" is associated with the VMA2 belonging to the VLAN and a MAC address "00:11:22:33:44:55" of the server device D accommodating the VMA2. In FIG. 8, a virtual machine name or a device name corresponding to the MAC address is indicated as a reference. In addition, in the example described in FIG. 8, VLAN IDs "0" and "1" are associated with IP addresses of the VMa and the VMb omitted in FIG. 5 and MAC addresses of the server devices 50 accommodating the VMa and VMb, respectively.

In FIG. 8, the IP addresses have been exemplified as addresses designated in the VLAN, but the addresses are not limited thereto. Various addresses which are able to specify virtual machines or devices according to the protocol other than an IP may be used. The IP addresses in the following description for figures other than FIG. 8, are the same as above.

For example, in the ARP table T2 retained in the router A, examples of the virtual machine connected to the outside of the router 40 include the VMA2 and the VMA3 of the second center 2 which are on the outside of the router A (first center 1) as depicted in FIG. 5. In addition, examples of the device connected to the outside of the router 40 include the storage B of the second center 2 as depicted in FIG. 5.

The router 40 refers to the ARP table T2 when receiving information which is transmitted from the VM 51 in the first center 1 as the own center to a destination IP address which is on the outside of the router 40 and in the VLAN to which the VM 51 belongs. The router 40 determines a MAC address corresponding to the destination IP address from the ARP table T2, and relays the information from the VM 51 to the determined MAC address.

When the destination IP address of information toward the outside, received through the switch 30, is not registered in the ARP table T2, the router 40 broadcasts an ARP request including the destination IP address. The virtual machine or the device corresponding to the destination IP address feeds a reply including its own MAC address back to the router 40 when receiving the ARP request. The router 40 updates the ARP table T2 by registering the received MAC address in the ARP table T2 in association with the VLAN ID and the destination IP address.

The traffic table T3 is information for managing, for each VLAN, a data amount of information which is transmitted (relayed) from the router 40 (own center) to the outside of the router 40. Specifically, the traffic table T3 is information in which a VLAN ID as an example of information specifying a VLAN and the number of transmitted packets as an example of a data amount of the information transmitted from the router 40 are associated with each other (see FIG. 9). For example, the traffic table T3 retained in the router A includes information in which a VLAN ID "0" is associated with "1000" which is the number of transmitted packets which are transmitted from the router A within a predetermined period of time in the VLAN.

The router 40 may be configured to generate the above-described ARP table T2 and traffic table T3 using a processor such as the CPU 70d, and store the tables in the memory 71d, the storage unit 72d, or the like. When the router 40 is a hardware router, the information may be relayed by switching by hardware such as a processor as an integrated circuit and the interface 73d.

The storage (storage device) 60 includes a CM 84 and a plurality of storage units 85 as described above with reference to FIG. 4.

The CM 84 (CPU 80) of the storage 60 performs various processes such as reading or writing of data from or in the storage unit 85 in response to a request from the server device 50 of the first center 1 or the second center 2. In addition, the CM 84 (CPU 80) may manage virtualization of the resources of the storage unit 85. For example, the CM 84 creates and manages one or more logical volumes using a storage area of the storage unit 85. The created logical volumes are assigned for each VM 51 which is executed in the server device 50 or for each VLAN.

(2-3-1) Configuration of Management Device

Figure 13:
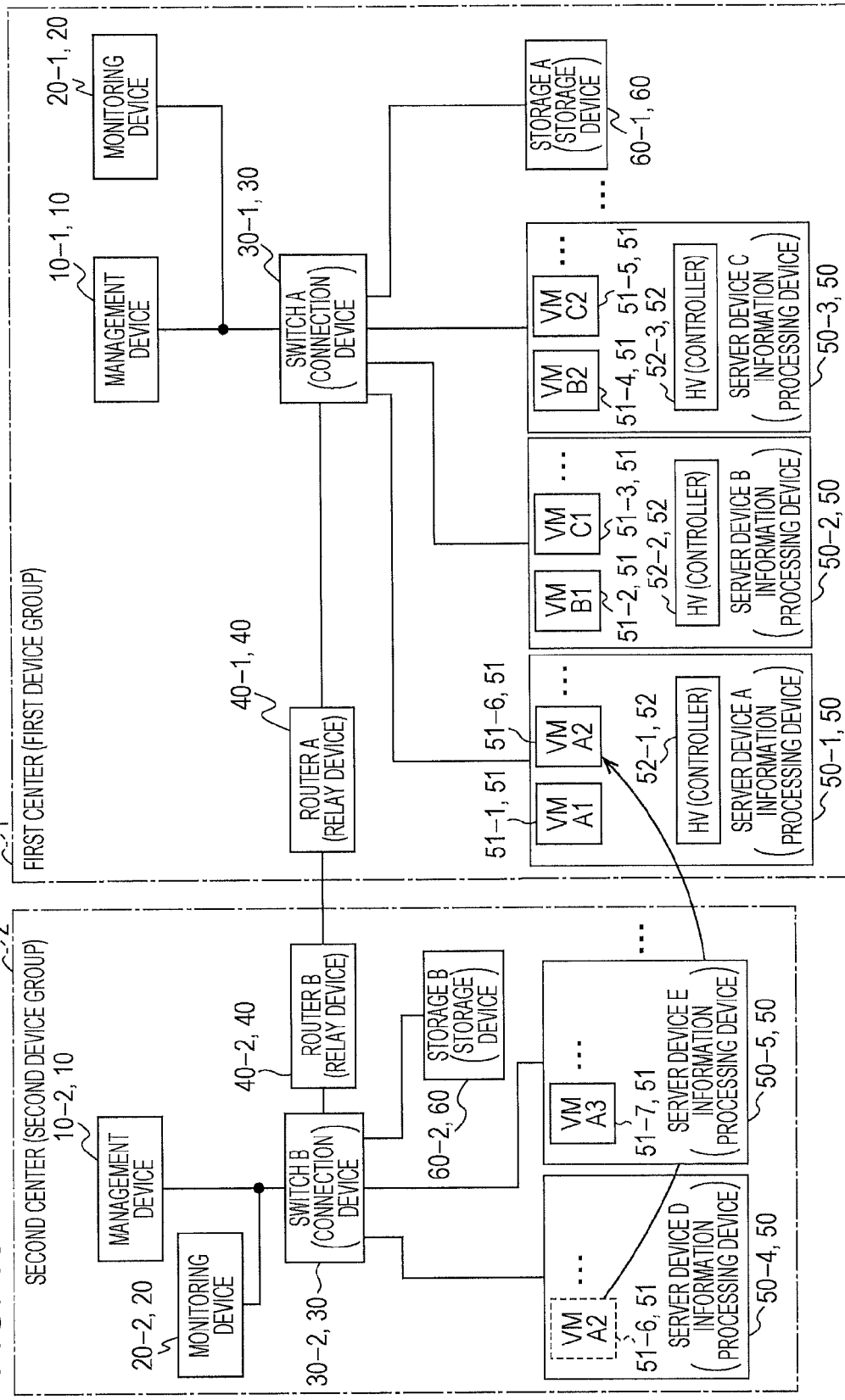
FIG. 13 is a diagram illustrating an example of movement of a virtual machine from a second center to a first center.

Next, an example of a configuration of the management device 10 will be illustrated with reference to FIGS. 10 to 13. FIG. 10 is a diagram illustrating an example of the configuration of the management device 10, according to a second embodiment, and FIGS. 11 and 12 are diagrams illustrating examples of a virtual machine management table T4 and a storage management table T5, respectively, which are retained in the management device 10. FIG. 13 is a diagram illustrating an example of the movement of the VMA2 of the second center 2 depicted in FIG. 5 to the first center 1.

The management device 10 includes a processor 11 and a configuration database retaining unit 12 as depicted in FIG. 10.

The processor 11 manages the VM 51 and the HV 52 which are executed by the first center 1. For example, the processor 11 performs management such as creation or deletion of the VM 51 in the server device 50 and movement (live migration) of the VM 51 between the server devices 50 (HVs 52), in accordance with an instruction which is input through the interface 73a, the input and output unit 74a, or the like. The management device 10 receives an instruction related to the management of the VM 51 from the manager of the first center 1, the service provider using the information processing system, the system which provides services, or the like.

The configuration database retaining unit (configuration information retaining unit) 12 retains the IP addresses of the server devices 50 and the storage 60 of the own center and the IP address of the VMs 51 accommodated in the server devices 50. For example, the configuration database retaining unit 12 retains the virtual machine management table T4 and the storage management table T5 depicted in FIGS. 11 and 12.

The virtual machine management table T4 is information for managing the IP addresses of the HVs 52 (server devices 50) and the VMs 51 which are controlled by (accommodated in) the HVs 52 (server devices 50). Specifically, the virtual machine management table T4 is information in which a HV ID (device ID) as an example of identification information of a HV 52 (server device 50), an IP address of the HV 52, and an IP address of a VM 51 which is controlled by the HV 52 are associated with each other (see FIG. 11). For example, the virtual machine management table T4 which is retained in the management device A includes information in which the HV 52-1 having a HV ID "3" is associated with an IP address "10.25.245.11" of the HV 52-1 and an IP address "10.25.100.11" of the VMA1 which is controlled by the HV 52-1. In FIG. 11, a virtual machine name corresponding to the IP address of the VM 51 is indicated as a reference.

In the example depicted in FIG. 11, the virtual machine management table T4 manages the HV IDs and the IP addresses of the HVs 52 on the assumption that the server devices 50 and the HVs 52 have a one-to-one relationship, but the management is not limited thereto. For example, a case in which the server devices 50 and the HVs 52 do not have a one-to-one relationship, a case in which the IP addresses of the HVs 52 and the IP addresses of the server devices 50 are different from each other, and the like are considered. In such cases, in the virtual machine management table T4, the identification information and IP address of at least one of the HV 52 and the server device 50 may be set.

The storage management table T5 is information for managing the IP address of the storage 60. Specifically, as exemplified in FIG. 12, the storage management table T5 is information in which a storage ID (device ID) as an example of identification information of the storage 60 and an IP address of the storage 60 are associated with each other. For example, the storage management table T5 of the management device A includes information in which the storage A having a storage ID "10" is associated with an IP address "10.25.245.100" of the storage A. In FIG. 12, a storage name corresponding to the IP address of the storage 60 is indicated as a reference.

In the virtual machine management table T4 and the storage management table T5 depicted in FIGS. 11 and 12, the HV ID and the storage ID may be omitted. In addition, the management device 10 may combine the virtual machine management table T4 and the storage management table T5 to manage the tables as one table.

Here, as exemplified in FIG. 13, a case in which the VMA2 of the second center 2 is moved from the server device D to the server device A of the first center 1 will be assumed.

Before the movement of the VMA2, since the server device D (HV 52; the depiction thereof is omitted in FIG. 13) accommodates the VMA2, the virtual machine management table T4 which is retained in the management device 10-2 of the second center 2 includes information in which the server device D (HV 52) is associated with the IP address of the VMA2.

After the movement of the VMA2, since the VMA2 is deleted from the server device D, the management device 10-2 deletes the IP address of the VMA2 from the virtual machine management table T4. When there exist no VMs 51 left which are to be executed by the server device D due to the deletion of the VMA2, the management device 10-2 may delete the entry itself of the server device D from the virtual machine management table T4.

In addition, after the movement of the VMA2, in the virtual machine management table T4 which is retained in the management device 10-1 of the first center 1, the IP address of the VMA2 is associated with (added to) the entry of the physical server A (HV 52-1). When the entry of the physical server A is not present in the virtual machine management table T4 which is retained in the management device 10-1, the management device 10-1 newly creates the entry of the physical server A after the movement of the VMA2.

As described above, the management device 10 retains the virtual machine management table T4 and the storage management table T5 as an example of the configuration database, and manages the configuration information of the devices of the own center (first center 1, in the case of the management device 10-1).

In addition, when the configuration database is updated, for example, the management device 10 may inform the monitoring device 20 of any of the updated table T4 or T5, information of the updated difference, and information indicating the update of the configuration database.

The above-described operation of the processor 11 is realized when the CPU 70a of the management device 10 deploys and executes a predetermined program in the memory 71a. In addition, the configuration database retaining unit 12 is realized by the memory 71a or the storage unit 72a of the management device 10.

(2-3-2) Configuration of Monitoring Device

Figure 14:
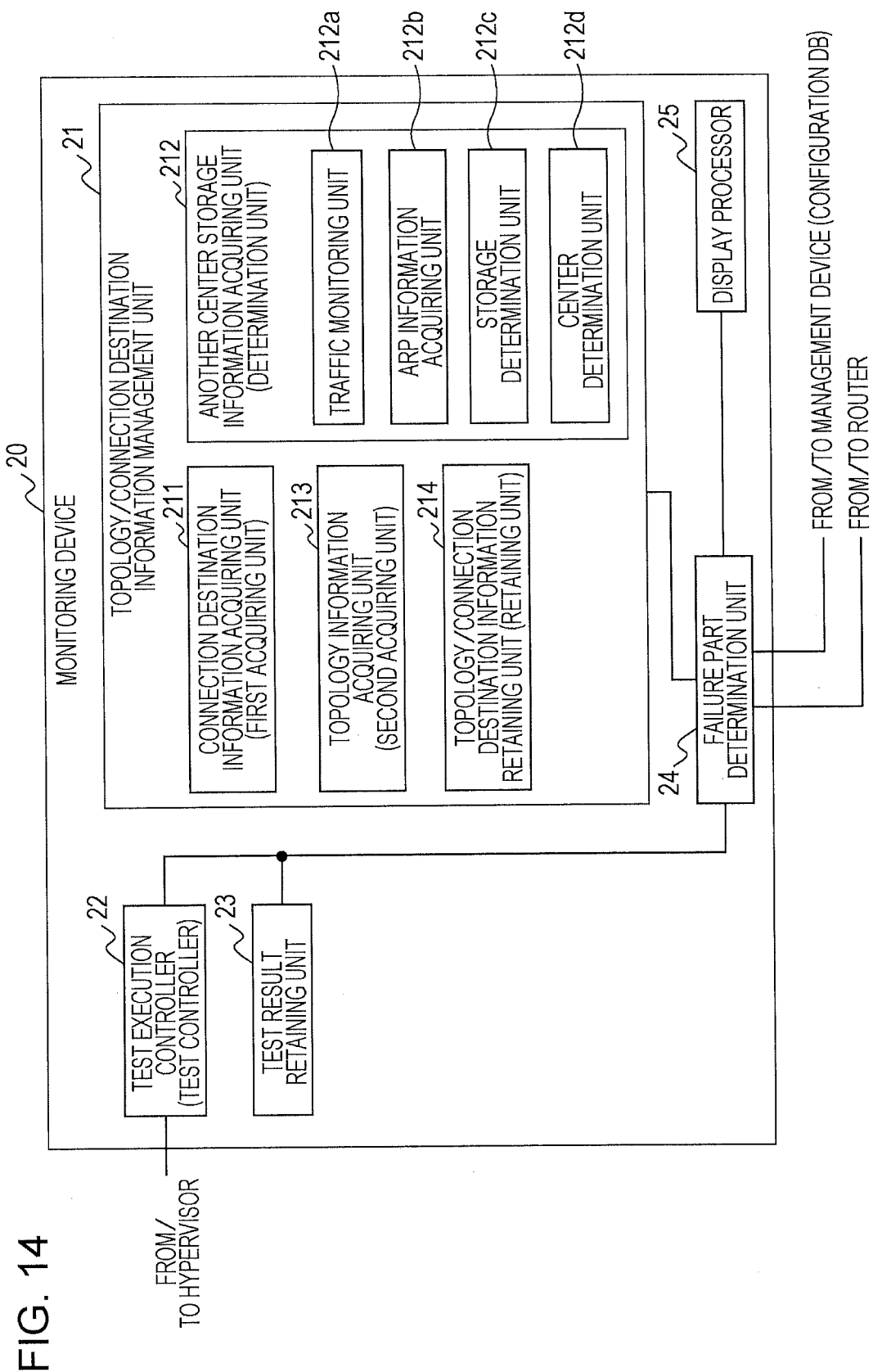
FIG. 14 is a diagram illustrating an example of a configuration of a monitoring device, according to a second embodiment.

Next, an example of a configuration of the monitoring device 20 will be described with reference to FIG. 14. FIG. 14 is a diagram illustrating an example of a configuration of the monitoring device 20, according to a second embodiment.

The monitoring device 20 according to the second embodiment is a device which specifies a failure part in the own center and specifies a VM 51 which is influenced by the failure. For example, as depicted in FIG. 14, the monitoring device 20 includes a topology/connection destination information management unit 21, a test execution controller 22, a test result retaining unit 23, a failure part determination unit 24, and a display processor 25.

Figure 16:
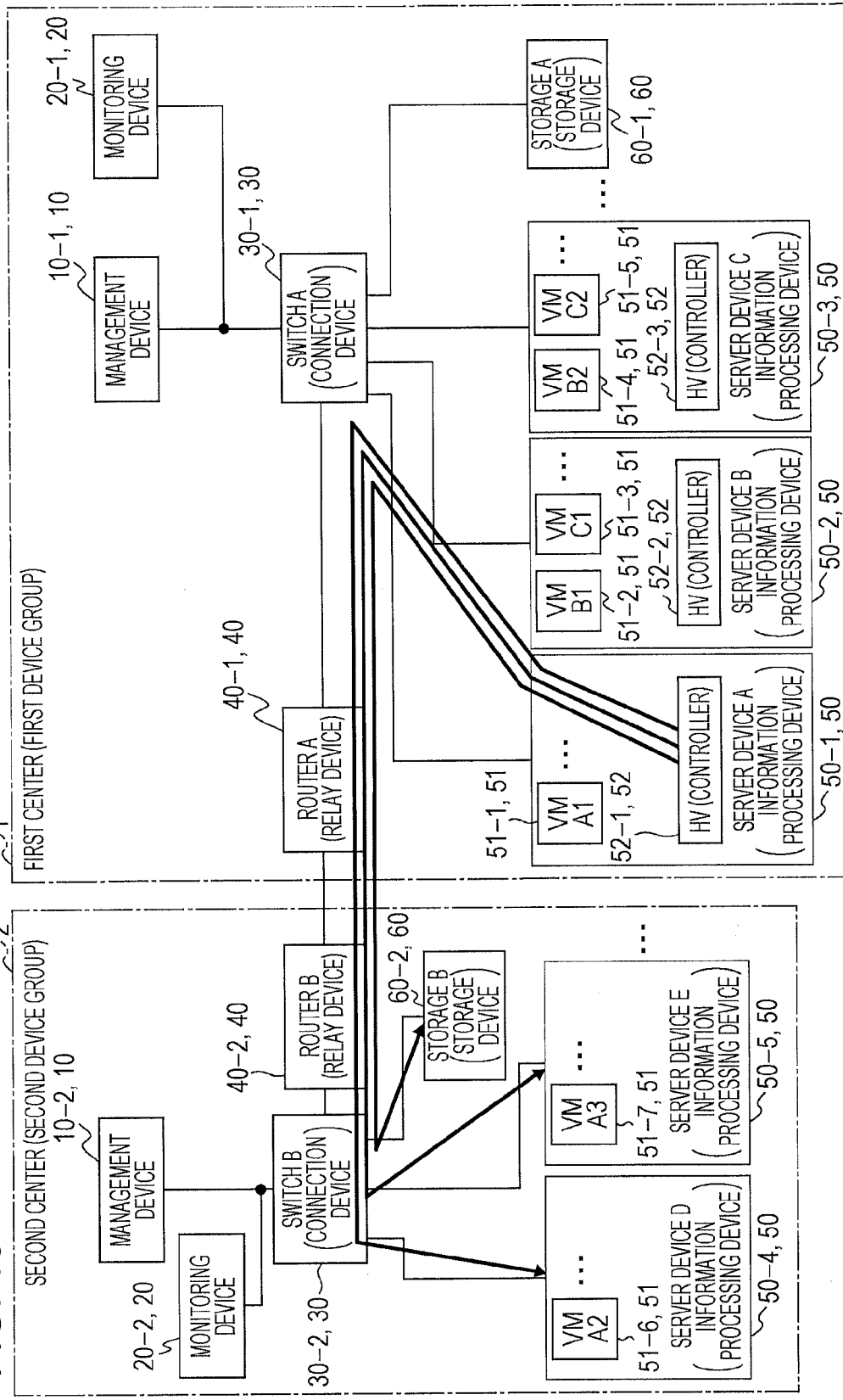
FIG. 16 is a diagram illustrating an example of transmission of a command which is to be responded by a storage, according to an embodiment.
Figure 18:
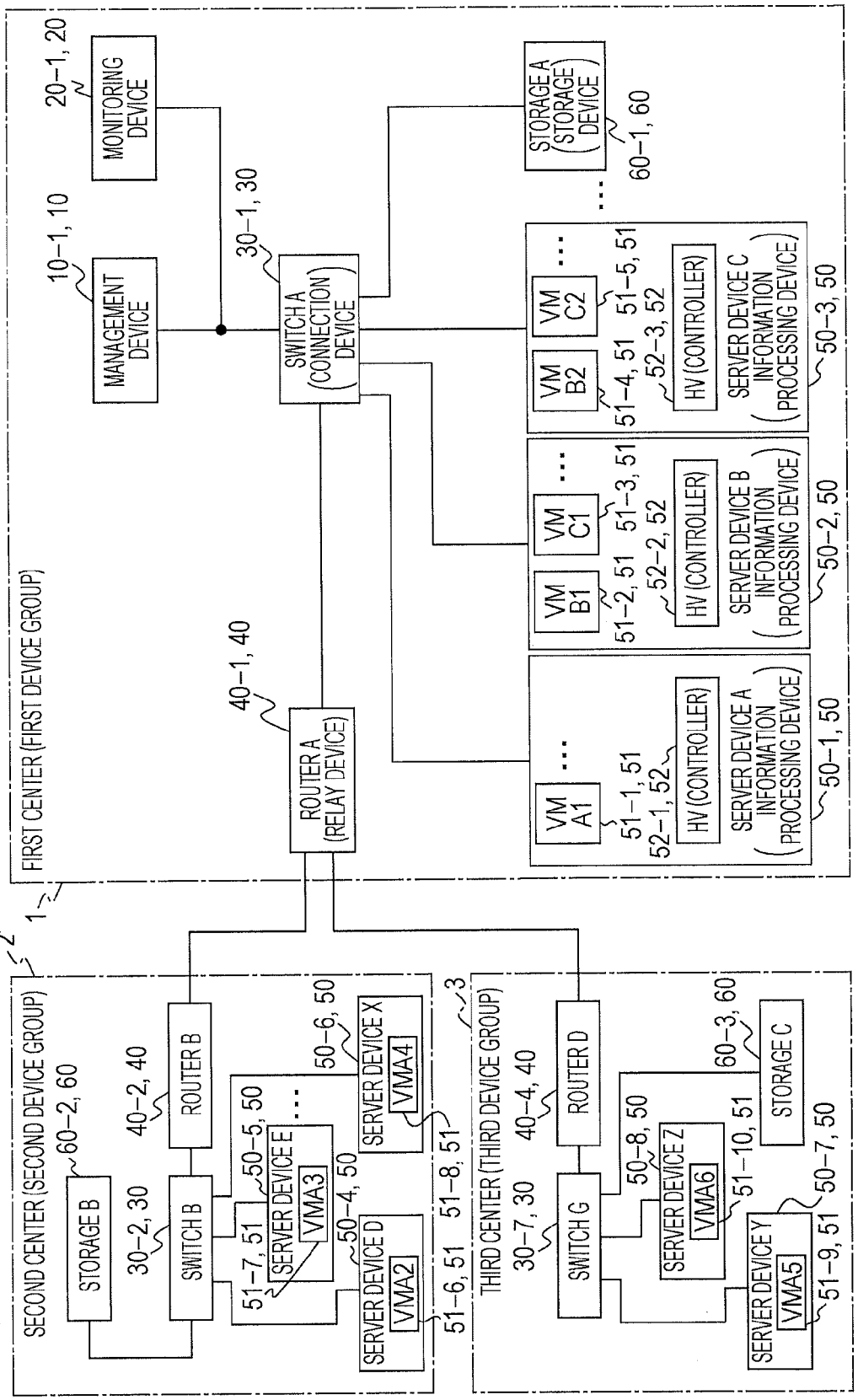
FIG. 18 is a diagram illustrating an example of a process of a center determination unit of a monitoring device, according to a second embodiment.
Figure 19:
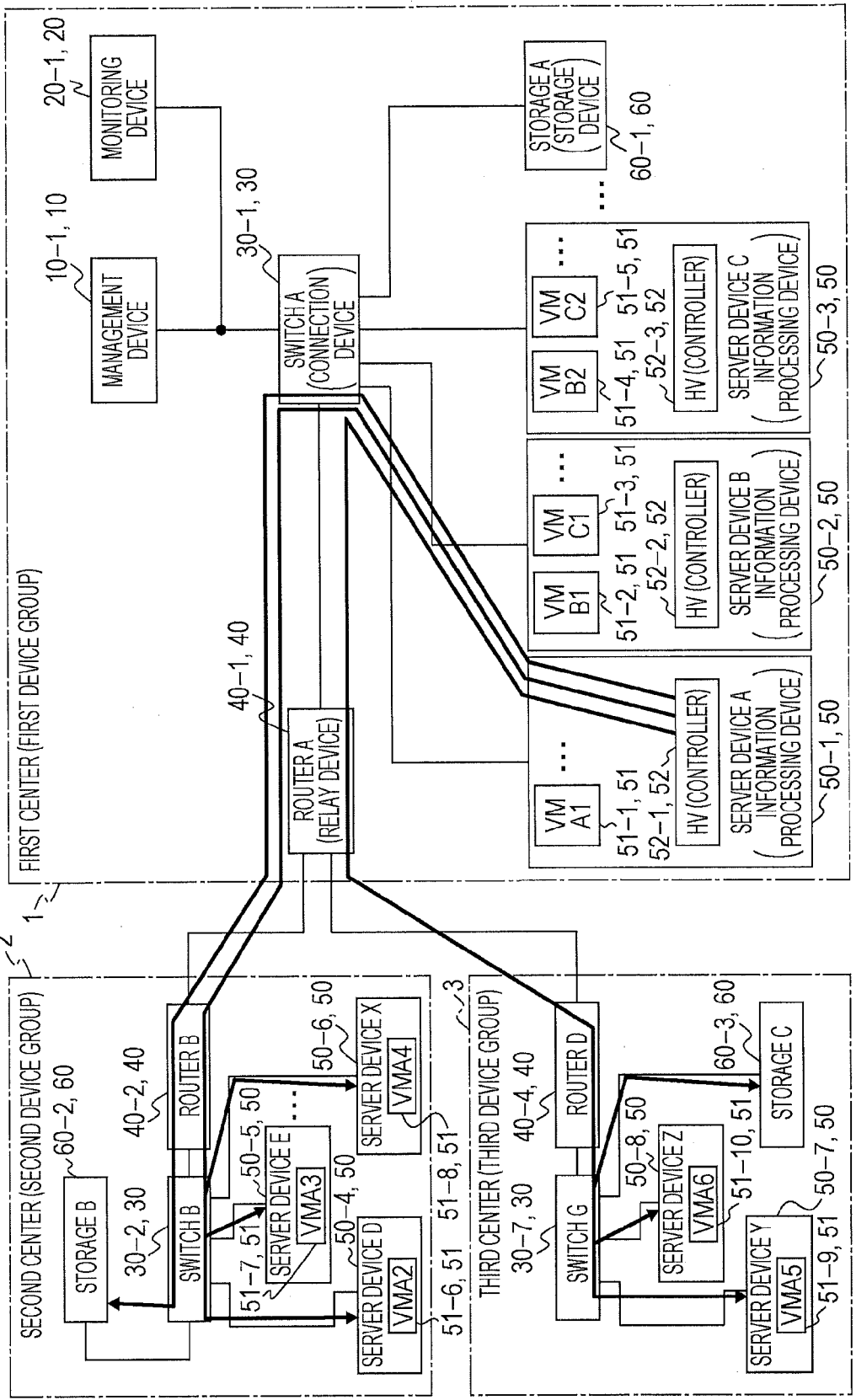
FIG. 19 is a diagram illustrating an example of communication confirmation by a server device, according to an embodiment.

(2-3-2-1) Description of Topology/Connection Destination Information Management Unit First, the topology/connection destination information management unit 21 will be described with reference to FIGS. 15 to 20. FIG. 15 is a diagram illustrating an example of a connection destination information management table T6 which is retained in the monitoring device 20, according to a second embodiment. FIG. 16 is a diagram illustrating an example of the transmission of a command which is to be responded by the storage 60 by the server device 50 depicted in FIG. 5. FIG. 17 is a diagram illustrating an example of a storage search result table T7 which is retained in the monitoring device 20, according to a second embodiment. FIG. 18 is a diagram illustrating an example of a process of a center determination unit 212d of the monitoring device 20. FIG. 19 is a diagram illustrating an example of the communication confirmation by the server device 50 depicted in FIG. 18. FIG. 20 is a diagram illustrating an example of a communication group management table T8 which is retained in the monitoring device 20.

The topology/connection destination information management unit 21 collects topology information of the own center to determine a target device of a communication test in the own center, that is, a connection destination for communication confirmation using a Ping or the like, and to estimate a failure part from the test results. Specifically, the topology/connection destination information management unit 21 may be configured to include a connection destination information acquiring unit 211, an another center storage information acquiring unit 212, a topology information acquiring unit 213, and a topology/connection destination information retaining unit 214.

The connection destination information acquiring unit (first acquiring unit) 211 manages the connection destination information management table T6 as an example of information indicating a connection destination for communication confirmation. Specifically, the connection destination information acquiring unit 211 acquires the IP addresses of the HVs 52 (server devices 50) and the storage 60 in the own center from the configuration database (see FIGS. 11 and 12)

of the management device 10, and generates or updates the connection destination information management table T6 depicted in FIG. 15.

The connection destination information management table T6 stores information in which a connection destination ID as an example of identification information of a connection destination and an IP address of the connection destination are associated with each other (see FIG. 15). For example, the connection destination information management table T6 which is retained in the monitoring device A includes information in which the server device 50-1 having a connection destination ID "0" is associated with an IP address "10.25.245.11" of the server device 50-1 (HV 52-1). In FIG. 15, a device name corresponding to the IP address of the server device 50-1 is indicated as a reference.

In the connection destination information management table T6, the IP address of the "storage B" which is a device name corresponding to a connection destination ID "n" is collected and set by the another center storage information acquiring unit 212 to be described later. In addition, the connection destination information management table T6 depicted in FIG. 15 may be generated as just a list of connection destination IP addresses by omitting the connection destination IDs.

The connection destination information acquiring unit 211 refers to the configuration database retaining unit 12 of the management device 10 on a regular basis to determine whether the virtual machine management table T4 and the storage management table T5 are updated. When at least one of the virtual machine management table T4 and the storage management table T5 is updated, the connection destination information acquiring unit 211 updates the connection destination information management table T6 to the latest state on the basis of the IP address added or deleted to or from the configuration database.

For example, in the example depicted in FIG. 13, a case in which after the movement of the VMA 2, the entry of the server device D is deleted from the virtual machine management table T4 which is retained in the management device 10 of the second center 2 will be considered. In this case, the monitoring device 20-1 of the first center 1 detects the addition of the VMA 2 to the server device A by the connection destination information acquiring unit 211, but the entry of the server device A is already set in the connection destination information management table T6, and thus the update is not performed. The monitoring device 20-2 of the second center 2 deletes the connection destination ID of the server device D and the entry of the connection destination IP address from the connection destination information management table T6 by the connection destination information acquiring unit 211 to stop the communication test performed on the server device D.

The connection destination information acquiring unit 211 may not refer to the configuration database retaining unit 12 on a regular basis, but may receive the updated table T4 or T5 from the management device 10 when the configuration database is updated. The connection destination information acquiring unit 211 may receive information (difference) of an updated part of the table T4 or T5 from the management device 10. Otherwise, the connection destination information acquiring unit 211 may refer to the configuration database of the management device 10 upon receiving information indicating the update of the configuration database from the management device 10 as a trigger. In this manner, the connection destination information acquiring unit 211 performs communication related to the configuration database with the management device 10 in a spontaneous or passive manner to update the connection destination information management table T6.

In addition, the connection destination information acquiring unit 211 may further collect the IP addresses of the switch 30 and the router 40 in the own center, in addition to the IP addresses of the server devices 50 and the storage 60 to add the collected IP addresses to the connection destination information management table T6 as connection destination IP addresses. Specifically, the connection destination information acquiring unit 211 issues a predetermined command for collecting IP addresses to the switch 30 and the router 40 and receives a response including the IP address from the switch 30 and the router 40 to collect the IP addresses of the switch 30 and the router 40.

For example, the connection destination information acquiring unit 211 acquires configuration information such as a management information base (MIB) from the switch 30 and the router 40 using a protocol for monitoring such as a simple network management protocol (SNMP). The connection destination information acquiring unit 211 extracts the IP addresses included in the acquired configuration information.

The monitoring device 20 is able to increase the connection destinations for communication confirmation and increase the accuracy of the communication test to be described later, by further collecting the IP addresses of the switch 30 and the router 40, thereby allowing the failure part to be more accurately specified.

The another center storage information acquiring unit (determination unit) 212 is an example of the determination unit 212 according to a first embodiment. The another center storage information acquiring unit 212 determines whether one or more destination addresses of information which is transmitted from the router 40 to the outside of the own center include an address of a storage 60 of another center which is a destination of the access of the server device 50.

When recognizing the addition of the VM 51 to at least one server device 50 of the own center, the another center storage information acquiring unit 212 according to the second embodiment determines whether there is transmission of information from the router 40 to the VLAN to which the added VM 51 belongs. In addition, when determining that there is information transmission, the another center storage information acquiring unit 212 determines whether one or more destination addresses of the information, retained in the router 40, which is transmitted to the VLAN include the address of the storage 60 of another center.

Hereinafter, an example of the configuration of the another center storage information acquiring unit 212 will be described in detail.

The another center storage information acquiring unit 212 may be configured to include a traffic monitoring unit 212a, an ARP information acquiring unit 212b, a storage determination unit 212c, and a center determination unit 212d.

When recognizing the addition of the VM 51 to at least one server device 50 of the own center through the above-described communication related to the configuration database with the management device 10, the traffic monitoring unit 212a monitors traffic which is transmitted to the outside of the router 40. Specifically, the traffic monitoring unit 212a acquires configuration information such as a MIB from the router 40 to collect the traffic table T3, thereby determining whether the traffic of the own center to the outside in the same VLAN as the added VM 51 is increased (generated).

Here, examples of the case in which the VM 51 is added in the own center include a case in which a new VM 51 is created by the management device 10 and a case in which the VM 51 is moved from another center by live migration. The VM 51 added to the own center through the movement from another center continuously accesses the storage 60 of the movement source center without change of the VLAN to which the VM 51 belongs.

Therefore, when recognizing the addition of the VM 51 in the own center, the traffic monitoring unit 212*a* determines whether new VLAN traffic is caused with reference to the traffic table T3 collected by the MIB.

For example, the traffic monitoring unit 212*a* is able to store information specifying at least the VLAN in which traffic is caused in the memory 71*b*, the storage unit 72*b*, or the like when referring to the traffic table T3. In addition, the traffic monitoring unit 212*a* may compare the traffic table T3 collected by the MIB with the information specifying the VLAN, previously retained in the memory 71*b*, to determine whether there is a VLAN in which new traffic is caused. In this manner, the traffic monitoring unit 212*a* judges the VM 51 belonging to the VLAN in which new traffic is caused to another center destination, as a VM 51 moved from another center.

The ARP information acquiring unit 212*b* collects one or more destination addresses related to the newly caused traffic from the router 40 when the traffic monitoring unit 212*a* judges the added VM 51 as a VM 51 moved from another center. Specifically, the ARP information acquiring unit 212*b* acquires configuration information such as a MIB and acquires an ARP table T2 corresponding to the VLAN in which new traffic is caused.

For example, a case in which the traffic monitoring unit 212*a* determines that new traffic is caused in a VLAN corresponding to the VLAN ID "2" in the traffic table T3 depicted in FIG. 9 will be assumed. At this time, the ARP information acquiring unit 212*b* extracts IP addresses corresponding to the VLAN ID "2" corresponding to the newly caused traffic from the ARP table T2 depicted in FIG. 8. That is, the ARP information acquiring unit 212*b* acquires IP addresses "10.25.245.2" "10.25.245.3", and "10.25.245.110" corresponding to the VLAN ID "2".

In addition, the ARP information acquiring unit 212*b* generates and stores the storage search result table T7 exemplified in FIG. 17, in which the acquired series of IP addresses are provided as destination IP addresses, in the memory 71*b*, the storage unit 72*b*, or the like. The column of the negotiation command reception result in the storage search result table T7 is blank when the ARP information acquiring unit 212*b* generates the table.

The traffic monitoring unit 212*a* and the ARP information acquiring unit 212*b* are able to acquire a MIB from the router 40 using a protocol for monitoring such as a SNMP.

In addition, each of the traffic monitoring unit 212*a* and the ARP information acquiring unit 212*b* may collect the traffic table T3 and the ARP table T2 at an arbitrary time such as at regular intervals.

The storage determination unit 212*c* transmits a command which is to be responded by the storage 60, to the one or more destination IP addresses acquired from the router 40, and determines a destination IP address responding to the command as an address of the storage 60 of another center.

Specifically, the storage determination unit 212*c* informs an arbitrary HV 52 in the own center of information of the destination IP addresses of the storage search result table T7 to issue an instruction for transmission of a command which is to be responded only by the storage 60.

The HV 52 transmits a command to the informed destination IP addresses as depicted in FIG. 16 in response to the instruction from the storage determination unit 212*c*. When the HV 52-1 transmits a command, the HV 52-1 receives a response from the storage 60-2, and thus the HV 52-1 informs the storage determination unit 212*c* of at least information specifying the response transmission source with respect to the received response.

The storage determination unit 212*c* may transmit for oneself a command which is to be responded by the storage 60 to the destination IP address without informing the HV 52 of the instruction for transmission of a command.

The storage determination unit 212*c* updates the storage search result table T7 exemplified in FIG. 17, on the basis of the response results informed from the HV 52. For example, the storage determination unit 212*c* sets, for example, "1" (in FIG. 17, represented by "O") as a negotiation command reception result with respect to the destination IP address responding to the command. On the other hand, the storage determination unit 212*c* sets, for example, "0" (in FIG. 17, represented by "X") as a negotiation command reception result with respect to the destination IP address which does not respond to the command. In FIG. 17, a device name corresponding to the destination IP address is indicated as a reference.

Here, the ARP information acquiring unit 212*b* does not grasp whether the acquired IP address is an IP address of the VM 51 or the storage 60 at the time when acquiring the IP address corresponding to the selected VLAN. Therefore, the storage determination unit 212*c* determines which one of the series of IP addresses acquired by the ARP information acquiring unit 212*b* the address of the storage 60 of another center connected to the outside of the router 40 is, as described above. Accordingly, the another center storage information acquiring unit 212 is able to specify the destination IP address responding to the command transmitted from the storage determination unit 212*c*, as an address of the storage 60 which is a measurement target of the communication test.

In addition, the storage determination unit 212*c* sets the destination IP address specified as the address of the storage 60 which is a measurement target of the communication test, in the connection destination information management table T6 depicted in FIG. 15.

Examples of the command which is to be responded only by the storage 60 include a command which is used in the management of the storage 60, such as a negotiation command of a network attached storage (NAS) which requests a version of the application of the storage 60.

When the storage 60 which may be a measurement target of the communication test is dispersed in a plurality of other centers, the center determination unit 212*d* performs a process of narrowing one or more measurement target centers from the plurality of centers.

Here, as exemplified in FIG. 18, a case in which the first center 1 is connected to a second center 2' and a third center 3 through the router 40-1 will be assumed.

For the sake of simplification, management devices 10 and monitoring devices 20 of the second center 2' and the third center 3 will be omitted in FIG. 18. The second center 2' includes one or more server devices 50-6 in addition to the same configuration as the second center 2 depicted in FIG. 5. The third center 3 includes a switch 30-7, a router 40-4, server devices 50-7 and 50-8, and a storage 60-3. The server devices 50-4 to 50-8 execute respectively VMs 51-6 to 51-10 which are virtual machines used by a user A, and execute respectively HVs 52 (omitted).

Hereinafter, the server devices 50-4 to 50-8 may be represented by server devices D, E, X, Y, and Z, respectively, and the VMs 51-6 to 51-10 may be represented by VMAs 2 to 6, respectively, as depicted in FIG. 18. In addition, the storages 60-2 and 60-3 may be represented by storages B and C, respectively, as depicted in FIG. 18.

In the case depicted in FIG. 18, for example, a case in which the VM 51 which accesses the storage B of the second center 2' is moved from the second center 2' to the first center 1, and after the movement, continuously accesses the storage B of the second center 2' through a VLAN will be considered. In this case, the traffic monitoring unit 212a determines the added VM 51 as a VM 51 moved from another center, and the ARP information acquiring unit 212b acquires the IP address corresponding to the VLAN of the added VM 51 from the router 40-1.

As described above, the ARP table T2 includes destination IP addresses for which the access has actually occurred in the VLAN. That is, the IP addresses acquired by the ARP information acquiring unit 212b includes the IP address of the storage B of the second center 2' which has been accessed by the VM 51, but does not include the IP address of the storage C of the third center 3. Accordingly, the storage determination unit 212c is able to determine the storage B which is a measurement target of the communication test through the above-described process of determining the storage 60.

In the case depicted in FIG. 18, for example, a case in which the VM 51 which accesses both of the storage B of the second center 2' and the storage C of the third center 3 is moved from the second center 2' or the third center 3 to the first center 1 will be considered. In this case, when the VM 51 continuously accesses the storages B and C of both of the centers 2' and 3 through a VLAN after the movement, the IP addresses acquired by the ARP information acquiring unit 212b include the IP addresses of the storages B and C of both of the centers 2' and 3. Accordingly, the storage determination unit 212c is able to determine the storages B and C which are measurement targets of the communication test through the above-described process of determining the storage 60.

However, when the communication test is performed on a plurality of centers, the processing load of the server device 50 which issues a Ping as an example of the communication test increases. In addition, the number of storages 60 of other centers responding to the Ping and the number of devices which relay the Ping and the response, such as the switches 30 and the routers 40 of both of the centers are increased in accordance with the number of centers which are measurement targets of the communication test. As a result, a problem occurs in that the greater the number of the centers which are measurement targets of the communication test, the greater the processing load of the entire information processing system and the greater the communication amount in the own center and between the own center and each of the plurality of centers.

Therefore, the center determination unit 212d according to the second embodiment narrows one or more measurement target centers from a plurality of centers which may be measurement targets of the communication test.

Specifically, when the ARP information acquiring unit 212b acquires two or more destination IP addresses in the same VLAN from the router 40, the center determination unit 212d instructs an arbitrary HV 52 in the own center to confirm the communication with respect to the two or more destination IP addresses.

For example, the center determination unit 212d informs the HV 52 of information of the two or more destination IP addresses in the same VLAN, acquired by the ARP information acquiring unit 212b, to issue an instruction to issue a Ping as an example of the communication confirmation.

The HV 52 issues a Ping to the two or more destination IP addresses acquired by the ARP information acquiring unit 212b as depicted in FIG. 19, in response to the instruction from the center determination unit 212d. When the HV 52-1 issues a Ping, the HV 52-1 receives the response from each device, and thus the HV 52-1 informs the center determination unit 212d of the received response results.

The center determination unit 212d may not inform the HV 52 of the instruction for issuance of a Ping, but may issue a Ping for oneself to the two or more destination IP addresses.

In addition, the center determination unit 212d generates a communication group management table T8 depicted in FIG. 20 on the basis of the results of the communication confirmation with respect to the destination IP addresses, and stores the table in the memory 71b, the storage unit 72b, or the like.

The communication group management table T8 is information for grouping two or more destination IP addresses for each center. Specifically, the communication group management table T8 is information in which a destination IP address, a response time (ms) as an example of the communication confirmation result, and a group ID of destination IP addresses grouped on the basis of the results of the communication confirmation by the center determination unit 212d are associated with each other. For example, the communication group management table T8 includes information in which a destination IP address "10.25.245.2" of the VMA2 which is executed by the server device D of the second center 2' is associated with a response time (ms) "10" and a group ID "0". In FIG. 20, a virtual machine name or a device name corresponding to the destination IP address is indicated as a reference.

In this manner, for example, the center determination unit 212d groups destination IP addresses with similar response times on the basis of the results of the communication confirmation, and assigns a group ID to each of a plurality of the groups obtained by the grouping. The reason for grouping of destination IP addresses with similar response times is that it can be estimated that there is a high possibility that a plurality of VMs 51 with similar response times are accommodated in the same center.

The center determination unit 212d selects one or more groups from the plurality of groups obtained by the grouping on the basis of a predetermined condition.

Here, the predetermined condition may include at least one of a short response time with respect to the communication confirmation and a large number of addresses. The reason for this is that it can be estimated that there is a high possibility that when the VM 51 is moved, the VM 51 is moved from a center with a large number of times of execution of the VM 51 to a center with a relatively small number of times of execution of the VM 51, or a center relatively closer to the VM 51 is selected as a destination center, rather than a center distant from the VM. Through such estimation, the center determination unit 212d can narrow one or more centers as measurement targets of the communication test from the plurality of grouped centers. The center determination unit 212d counts the number of destination IP addresses for each group when the predetermined condition includes the number of addresses.

The center determination unit 212d selects one or more predetermined number of groups from the plurality of groups in order starting from the shortest response time with respect to the communication confirmation or/and in descending order of the number of destination IP addresses.

In addition, the center determination unit 212d causes the storage determination unit 212c to determine a storage 60 which is a measurement target of the communication test from one or more destination IP addresses of the selected one or more groups.

For example, the center determination unit 212d determines, as one group (group ID "0"; second center 2'), the VMAs 2 to 4 and the storage B with a response time of 10 (ms) in the communication group management table T8 depicted in FIG. 20. In addition, the center determination unit 212d determines, as one group (group ID "1"; third center 3), the VMAs 5 and 6 and the storage C with a response time of 100 (ms). The group "0" is four or more and the group "1" is three in terms of the number of destination IP addresses included in each group.

Accordingly, the center determination unit 212d selects the second center 2' corresponding to the group ID "0" with a short response time and a large number of addresses when selecting one center on the basis of the communication group management table T8 depicted in FIG. 20. The storage determination unit 212c specifies the address "10.25.245.110" of the storage B as the storage 60 which is a measurement target of the communication test from the group (second center 2') selected by the center determination unit 212d.

According to the center determination unit 212d, in the information processing system in which three or more centers are present, the measurement target centers of the communication test may be easily narrowed to specify a storage 60 which is a measurement target. Accordingly, the monitoring device 20 is able to suppress an increase in the processing load of the entire information processing system and reduce an increase in the communication amount in the own center and between the own center and each of the plurality of centers.

As described above, when detecting the addition of the VM 60 to the own center, the traffic monitoring unit 212a detects traffic to another center by acquiring the MIB of the router 40 of the own center. In addition, the ARP information acquiring unit 212b acquires a plurality of IP addresses in the same subnet as the VM 51. Furthermore, the center determination unit 212d causes the server device 50 to confirm the communication with respect to the acquired plurality of IP addresses to perform grouping with the response results of the communication confirmation, thereby specifying a group with the largest number of responses as a center which is a measurement destination. In addition, the storage determination unit 212c executes a command which is to be responded by the storage 60 on IP addresses of the group of the center which is a measurement destination to specify an IP address responding thereto as the storage 60 which is a measurement target of the communication test.

Accordingly, according to the another center storage information acquiring unit 212, a storage 60 which is used by the VM 51 migrated from another center can be specified even when the monitoring device 20 does not acquire configuration information of another center.

Accordingly, according to the another center storage information acquiring unit 212 of the monitoring device 20 of the first center 1, the storage 60 of the second center 2 can also be a monitoring target in the first center 1.

The topology information acquiring unit (second acquiring unit) 213 collects connection information indicating connection relationships between the ports of the switch 30 and the devices 10 to 60 connected to the ports. In addition, the topology information acquiring unit 213 is able to collect IP addresses of the network devices such as the switch 30 and the router 40 in the own center, the server device 50, and the storage 60. The topology/connection destination information management unit 21 manages the connection information (and the IP addresses of the devices) of each switch 30 collected by the topology information acquiring unit 213 as topology information indicating connection relationships between the devices of the own center. Specifically, the topology information acquiring unit 213 issues a predetermined command for collecting connection information to the switch 30 and receives a response including the connection information from the switch 30 to collect the connection information of the switch 30. When collecting the connection information from all of the switches 30 in the own center, the topology information acquiring unit 213 stores, as topology information, the collected connection information (and the IP addresses of the devices 30 to 60) in the topology/connection destination information retaining unit 214.

For example, the topology information acquiring unit 213 is able to collect the connection information table T1 by acquiring configuration information such as a MIB from the switch 30 using a protocol for monitoring such as a SNMP. Examples of the MIB which is collected by the topology information acquiring unit 213 include management information collected using a link layer discovery protocol (LLDP) or a cisco discovery protocol (CDP). In addition, the topology information acquiring unit 213 is able to acquire IP addresses by acquiring a MIB from each of the devices 30 to 60.

When the router 40, the server device 50, or the storage 60 other than the switch 30 retains the connection information table T1, the topology information acquiring unit 213 may also collect the connection information table T1 from the devices 40 to 60.

The topology/connection destination information retaining unit 214 is an example of a retaining unit which retains the connection destination information management table T6, which is generated by the connection destination information acquiring unit 211 and the another center storage information acquiring unit 212, and the topology information generated by the topology information acquiring unit 213.

As described above, the topology/connection destination information management unit 21 according to the second embodiment is able to add even a storage 60 of another center as a measurement target of the communication test when the VM 51 accesses the storage 60.

In the above description, the method is described in which the topology/connection destination information management unit 21 adds an IP address of a storage 60 of another center to the connection destination information management table T6 when a VM 51 is added to the own center.

On the contrary, for example, a case in which there is a VLAN in which traffic is reduced (no traffic is caused) in the traffic table T3 due to the deletion of the VM 51 from the own center will be assumed. In such a case, the topology/connection destination information management unit 21 preferably deletes the IP address corresponding to the VLAN in which traffic is reduced (no traffic is caused) from the connection destination information management table T6. When the topology/connection destination information management unit 21 retains the storage search result table T7 in the memory 71b or the like in association with the VLAN, the connection destination IP address corresponding to the VLAN in which traffic is reduced (no traffic is caused) may be easily identified.

Accordingly, it is possible to suppress performing the communication test with respect to the storage 60 of another center in which no access from the VM 51 occurs. Accordingly, it is possible to suppress an increase in the processing load of the devices such as the server device 50 which performs the communication test and the switches 30 and the routers 40 of both of the centers which relay a Ping as an example of the communication test and the response. In this manner, an increase in the processing load of the entire information processing system may be suppressed, and a communication amount in the own center and between the own center and each of the plurality of centers may be reduced.

Figure 21:
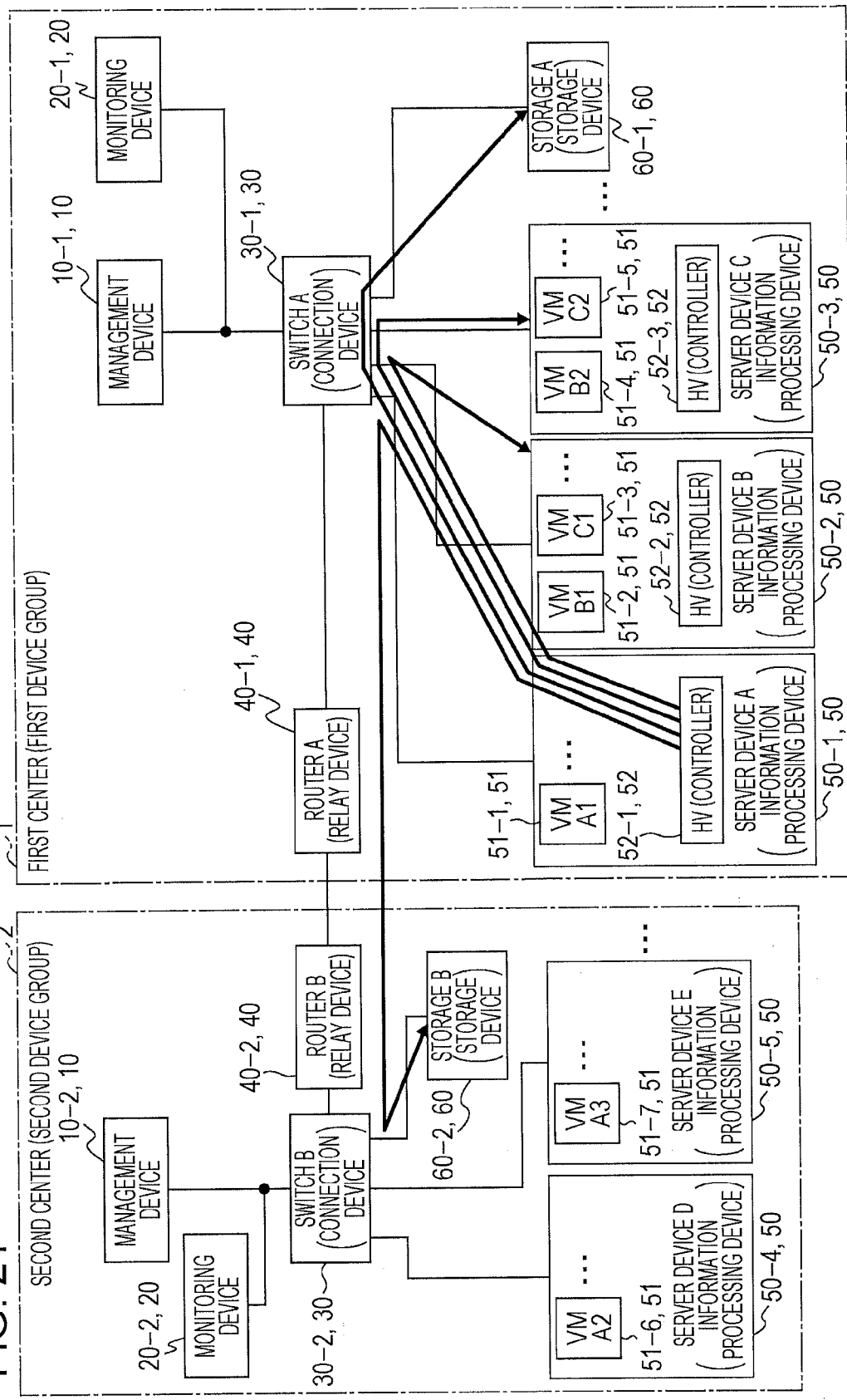
FIG. 21 is a diagram illustrating an example in which a hypervisor in a first center executes a communication test, according to an embodiment.

(2-3-2-2) Descriptions of Test Execution Control Unit and Test Result Retaining Unit Next, the test execution controller 22 and the test result retaining unit 23 will be described with reference to FIGS. 21 and 22. FIG. 21 is a diagram illustrating an example in which the HV 52 in the first center 1 depicted in FIG. 5 executes the communication test. FIG. 22 is a diagram illustrating an example of a communication result table T9 which is retained in the server device 50.

The test execution controller (test controller) 22 is an example of a test controller, according to a first embodiment. The test execution controller 22 causes any one of the plurality of server devices 50 in the own center to execute the communication test with respect to the destination IP address determined by the topology/connection destination information management unit 21. Specifically, the test execution controller 22 transmits an instruction for executing the communication test and information related to the target device of the communication test to the HV 52 of one server device 50 to execute the communication test with respect to the connection destination IP address set in the connection destination information management table T6.

For example, as illustrated in FIG. 21, a case in which the test execution controller 22 instructs the HV 52-1 of the server device A to execute the communication test with respect to the measurement destinations indicated in the connection destination information management table T6 depicted in FIG. 15 will be described. In this case, the HV 52-1 issues a Ping to the server devices B and C and the storage A through the switch A, and issues a Ping to the storage B of the second center 2 through the switch A, the routers A and B, and the switch B.

The information related to the target device of the communication test may be the connection destination information management table T6 itself, or information specifying a storage position of the table T6 in the monitoring device 20. In addition, the HV 52 which executes the communication test may be any HV 52 as long as it is a HV 52 which is accommodated in the server device 50 in the center including the test execution controller 22 (monitoring device 20).

When receiving the communication result table T9 as an example of the communication test results from the HV 52 instructed to execute the communication test, the test execution controller 22 stores the received communication result table T9 in the test result retaining unit 23.

The communication result table T9 is information in which communication test results are set for each connection destination IP address instructed by the test execution controller 22. Specifically, the communication result table T9 is information in which a connection destination IP as an example of identification information of the connection destination, the number of received packets from the connection destination with respect to a predetermined number of transmitted packets which are transmitted by a Ping which is an example of the communication test, and the number of lost packets are associated with each other (see FIG. 22). For example, the communication result table T9 includes information in which a connection destination ID "0" is associated with "10" which is the number of received packets and "0" which is the number of lost packets, and a connection destination ID "1" is associated with "9" which is the number of received packets and "1" which is the number of lost packets. FIG. 22 depicts the example in which the HV 52 transmits "10" packets to the connection destination by a Ping. However, the number of packets which are transmitted by a Ping is not limited thereto and an arbitrary number of packets may be transmitted.

The HV 52 may not set the number of received packets and the number of lost packets as communication test results in the communication result table T9, but, for example, may measure and set various information which can be used to judge the presence or absence of occurrence of a failure, such as a response time from the virtual machine or the device in the communication test.

The test result retaining unit 23 retains the communication test results (communication result table T9) received by the test execution controller 22 from the HV 52. The test result retaining unit 23 retains a communication determination result table T10 which is depicted in FIG. 23 and generated by the failure part determination unit 24 on the basis of the communication result table T9.

Figure 30:
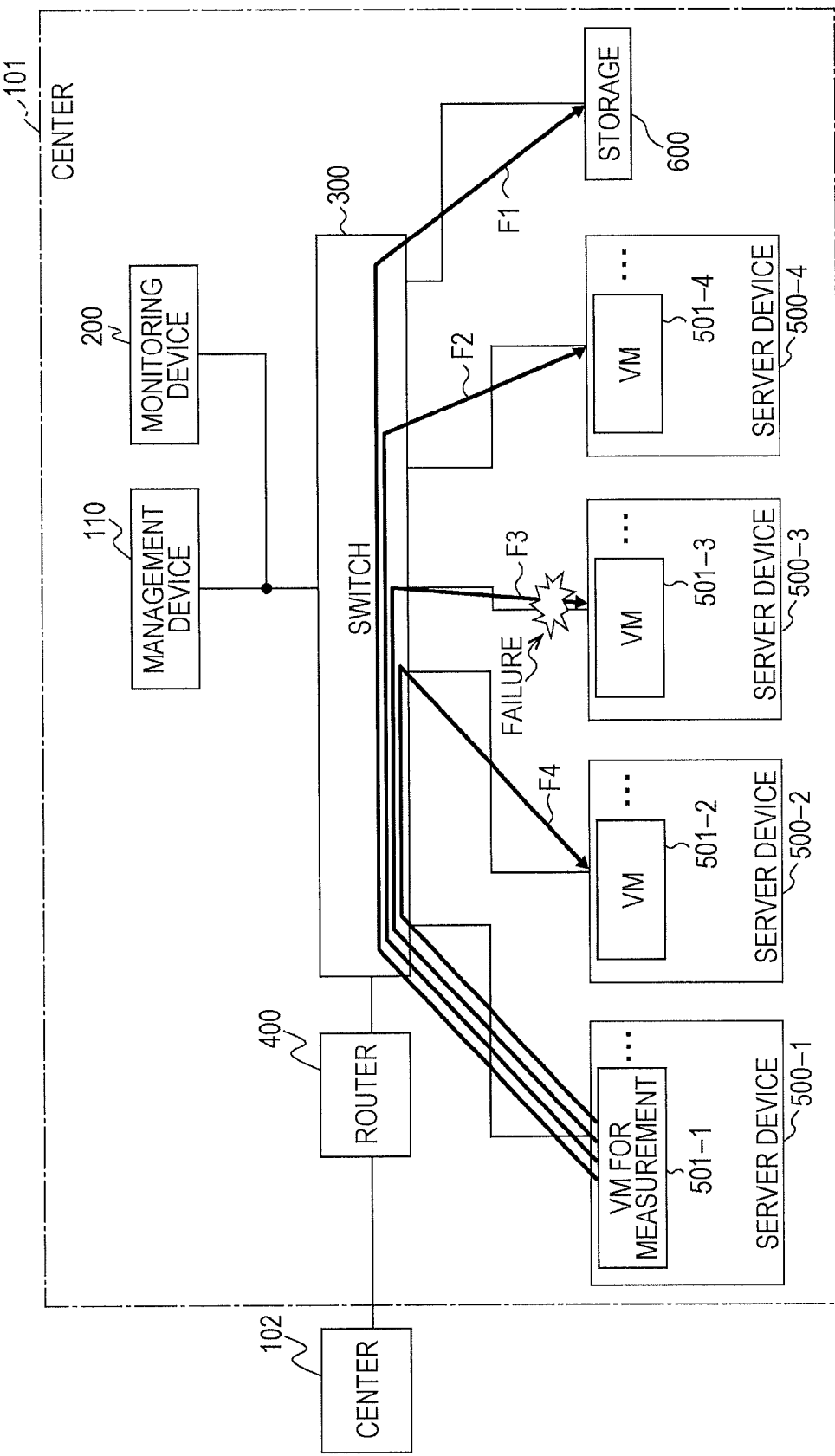
FIG. 30 is a diagram illustrating an example of a method of detecting an occurrence of a failure and specifying a failure part in a center.

Hitherto, VMs have executed the communication test as depicted in FIG. 30. The VMs are provided to a user, and thus in some cases, a manager of the information processing system uses, as a VM for measurement, one of a plurality of VMs which are provided to one user.

In addition, in many cases, communication over user's networks (subnets) from the VMs is limited from the viewpoint of security. In the example depicted in FIG. 30, a VM 501-1 for measurement, VMs 501-2 to 501-4 and a storage 600 belong to the same user's network. In this case, the VM 501-1 for measurement is able to subject the communication test to all of server devices 500 and the storage 600 in a center 101.

However, in the case of a large-scaled (wide-area) cloud system accommodating a large number of customers, the example depicted in FIG. 30 is a rare example, and one user usually uses one virtual machine. In such a case, a VM for measurement belonging to a user's network can perform the communication test only on the same user's network, and in order to perform the communication test on all of the devices in the center, up to all of users may have a VM for measurement.

There have been problems in that VMs to be used by a user are used for the communication test and a large number of VMs for measurement are used.

On the other hand, according to the test execution controller 22 according to the second embodiment, all of the devices in the center may be subjected to the communication test with one HV 52. Accordingly, the communication test may be performed without using the resources of the user as much as possible, and the processing load of the information processing system may be reduced.

Figure 24:
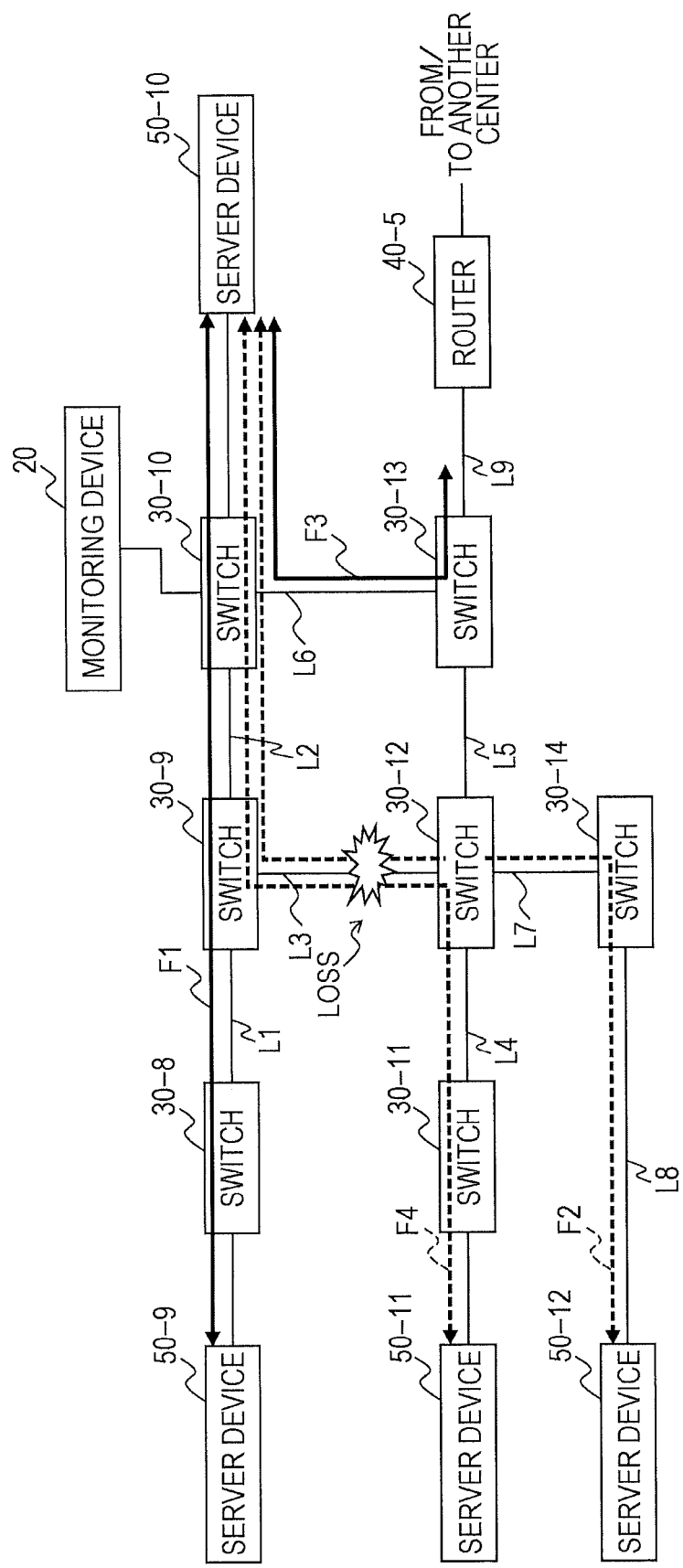
FIG. 24 is a diagram illustrating an example of a tomography analysis process which is performed by a failure part determination unit of a monitoring device, according to a second embodiment.

(2-3-2-3) Description of Failure Part Determination Unit and Display Output Unit Next, the failure part determination unit 24 and the display processor 25 will be described with reference to FIGS. 23 to 25. FIG. 23 is a diagram illustrating an example of the communication determination result table T10 which is retained in the monitoring device 20 according to a second embodiment. FIG. 24 is a diagram illustrating an example of a tomography analysis process which is performed by the failure part determination unit 24 of the monitoring device 20. FIG. 25 is a diagram illustrating an example of a method of determining a failure part by the failure part determination unit 24.

The failure part determination unit 24 specifies a failure part in the own center and specifies a VM 52 which is influenced by the failure.

Specifically, the failure part determination unit 24 instructs the test execution controller 22 to execute the communication test at a predetermined time.

Examples of the predetermined time at which the failure part determination unit 24 issues an instruction for execution of the communication test include a time at which the connection destination information management table T6 is generated or updated by the topology/connection destination information management unit 21 and a regular time. In this manner, the failure part determination unit 24 causes the test execution controller 22 to execute (re-execute) the communication test when the connection destination information management table T6 is updated or on a regular basis. Accordingly, even when the VM 51 is moved, the HV 52 is able to execute the communication confirmation on an appropriate measurement destination.

In addition, the failure part determination unit 24 generates the communication determination result table T10 depicted in FIG. 23 on the basis of the communication result table T9 retained in the test result retaining unit 23 when the communication test performed by the HV 52 is terminated.

The communication determination result table T10 is information in which a communication determination result for each connection destination IP address based on the results of the communication test which is executed by the HV 52 is set. Specifically, the communication determination result table T10 is information in which a connection destination ID as an example of identification information of the connection destination and a determination result which is obtained by comparing the lost packet in the communication result table T9 with a predetermined threshold are associated with each other (see FIG. 23). For example, the failure part determination unit 24 sets, for example, "0" (represented by "O" in FIG. 23) as a determination result corresponding to a connection destination ID "0" in the communication determination result table T10. The failure part determination unit 24 sets, for example, "1" (represented by "X" in FIG. 23) as a determination result corresponding to a connection destination ID "1".

The failure part determination unit 24 sets a predetermined threshold at "1" in the communication determination result table T10 depicted in FIG. 23 to determine that the determination result is "1" when the number of lost packets is "1" or greater. However, the determination is not limited thereto. For example, the failure part determination unit 24 may set the predetermined threshold at "2" or greater, or may control the predetermined threshold to make the predetermined threshold variable in accordance with an average or distribution of the number of lost packets of the connection destination IDs. When a response time is set rather than the number of lost packets in the communication result table T9, the failure part determination unit 24 is able to set the predetermined threshold at a time longer than an average response time.

In the second embodiment, determination based on the results of the communication test which is performed by the HV 52 is conducted in the monitoring device 20. Accordingly, the monitoring device 20 or a manager using the monitoring device 20 may easily set an appropriate predetermined threshold according to the environment of the information processing system.

In the communication result table T9 and the communication determination result table T10 depicted in FIGS. 22 and 23, a connection destination IP address or other information capable of specifying a connection destination may be set in place of the connection destination ID.

When the generated communication determination result table T10 includes a connection destination ID of which the determination result is "1", the failure part determination unit 24 detects the occurrence of a failure in a route up to a virtual machine or a device having the connection destination ID of which the determination result is "1", from the HV 52 which performed the communication test.

In addition, when detecting the occurrence of the failure, the failure part determination unit 24 specifies a failure part using a method such as tomography analysis on the basis of the device in which the failure occurs based on the center determination unit 212d, and the topology information retained in the topology/connection destination information retaining unit 214.

Upon specifying the failure part, the failure part determination unit 24 specifies a server device (physical server) 50 which is influenced by the failure on the basis of the topology information and the configuration database retained in the management device 10, and specifies a VM 51 which is executed by the specified server device 50. This allows the monitoring device 20 to instruct the management device 10 to move, to another server device 50, the VM 51 which is influenced.

In addition, the failure part determination unit 24 outputs information of the failure part, the specified server device 50 and VM 51 which are influenced by the failure, and the user using the VM 51 which is influenced by the failure, to the display processor 25, and outputs the information to an output device or the like of the input and output unit 74b of the monitoring device 20.

Hereinafter, a case in which the center including the monitoring device 20 has the configuration depicted in FIG. 24 will be exemplified to describe a tomography analysis process which is performed by the failure part determination unit 24.

In the example depicted in FIG. 24, the center includes the monitoring device 20, switches 30-8 to 30-14, a router 40-5, and server devices 50-9 to 50-12. Hereinafter, the description will be made on the assumption that a HV 52 (omitted) which is executed by the server device 50-10 executes the communication test. In FIG. 24, the arrows F1 to F4 represent a flow of the communication test which is executed by the server device 50-10, and the reference symbols L1 to L9 added between the devices represent a link.

The failure part determination unit 24 specifies the flows F1 to F4 for each destination IP address of the communication test on the basis of the HV 52 which performs the communication test, the device in which the occurrence of the failure is detected, and the topology information, and judges whether the flows F1 to F4 are normal or abnormal. In addition, the failure part determination unit 24 maps the determination results of the flows F1 to F4 of the communication test for each of the links L1 to L9 as depicted in FIG. 25.

For example, when the occurrence of a failure is not detected in the flow F1, that is, when the flow F1 is normal, for example, "0" ("normal"; represented by "O" in FIG. 25) is set with respect to the links L1 and L2 through which the flow F1 passes. On the other hand, when the occurrence of a failure is detected in the flow F2, that is, when the flow F2 is abnormal (suspicious), for example, "1" ("abnormal"; represented by "X" in FIG. 25) is set with respect to the links L2, L3, L7, and L8 through which the flow F2 passes. In this manner, the failure part determination unit 24 performs mapping based on the communication test results in the table of FIG. 25.

The failure part determination unit 24 judges a link through which at least one normal flow passes as "normal", but judges a link in which all of flows passing therethrough are abnormal as "abnormal" (suspicious). For example, in the examples depicted in FIGS. 24 and 25, since the flow passing through the links L3, L4, L7, and L8 is "abnormal", the failure part determination unit 24 judges the links L3, L4, L7, and L8 as "abnormal" as abnormality separation judgment. The failure part determination unit 24 estimates, for example, the link L3 with the largest number of flows passing therethrough as a quality-deteriorated part, that is, a failure part, among the links judged to be "abnormal".

Here, when the failure part determination unit 24 judges the links L4, L7, and L8 as "abnormal" and the link L3 which may be a quality-deteriorated part and through which both of the flows F2 and F4 pass is an abnormal link, there is a high possibility that the links L4 and L7 are also abnormal. Accordingly, the failure part determination unit 24 estimates the link L3 which is a link on the upstream side when viewed from the monitoring device 20 as a failure part.

When detecting the occurrence of a failure in a flow from the HV 52 to the storage 60 of another center, the failure part determination unit 24 specifies a failure part from among links from the HV 52 to the router 40 at the end edge of the own center.

In addition, the failure part determination unit 24 specifies the destination IP addresses of the flows F2 and F4 which are judged as "abnormal" from the connection destination information management table T6. The failure part determination unit 24 specifies a server device 50 and a VM 51 which are influenced by the failure, from the correspondence relationship between the specified destination IP addresses and the information of the VM 51 acquired from the configuration database.

Furthermore, the failure part determination unit 24 may specify a user using the VM 51 which is influenced by the failure from the management device 10, as a user who is influenced by the failure.

The failure part determination unit 24 estimates a failure part using tomography analysis as described above, and outputs at least one information of the specified failure part, the VM 51 which is influenced by the failure, and the user who is influenced by the failure, to the display processor 25.

In addition, the failure part determination unit 24 may cause the display processor 25 to present information related to the handling of the failure. For example, the display processor may present a server device 50 of which the measurement result of the communication test is judged as normal as an evacuation destination of the VM 51 which is influenced by the failure.

The display processor 25 outputs information of the failure part informed from the failure part determination unit 24, the server device 50 and the VM 51 which are influenced by the failure, and the user who is influenced by the failure, to the output device or the like of the input and output unit 74b of the monitoring device 20. The display processor 25 may output information informed from the failure part determination unit 24 to a monitor or a printer as an example of the output device, may store the log in the storage unit 72b, or may transmit a message to the manager or the like.

The above-described operations of the topology/connection destination information management unit 21, the test execution controller 22, the failure part determination unit 24, and the display processor 25 may be realized when the CPU 70b of the monitoring device 20 deploys and executes a predetermined program in the memory 71b. In addition, the topology/connection destination information retaining unit 214 and the test result retaining unit 23 may be realized by the memory 71b, or the storage unit 72b of the monitoring device 20.

In addition, the above-described functions of the topology/connection destination information management unit 21, the test execution controller 22, the failure part determination unit 24, and the display processor 25 may be appropriately combined or separated.

(2-3-3) Configuration of Server Device

Figure 26:
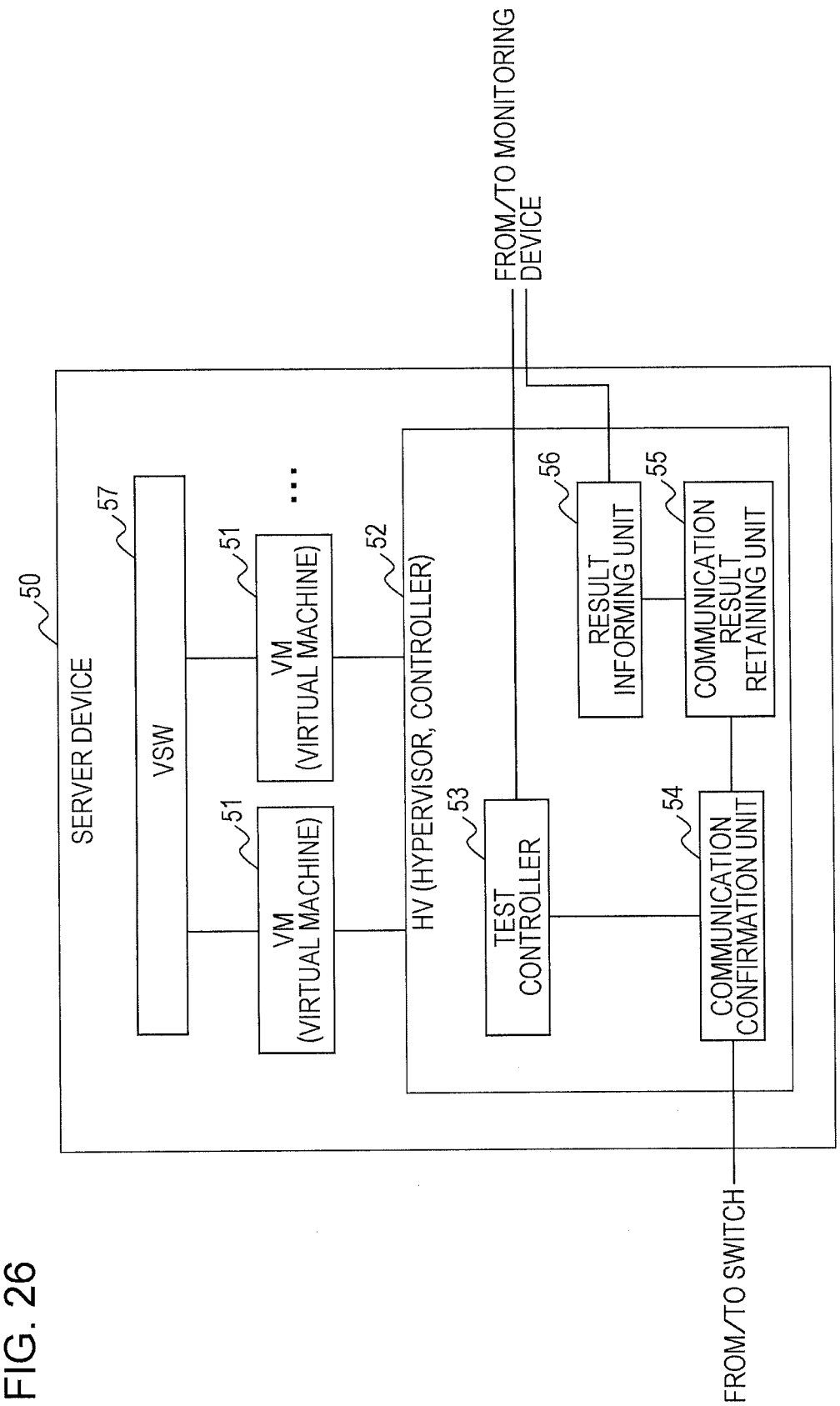
FIG. 26 is a diagram illustrating an example of a configuration of a server device, according to a second embodiment.

Next, an example of a configuration of the server device 50 will be described with reference to FIG. 26. FIG. 26 is a diagram illustrating an example of the configuration of the server device 50, according to a second embodiment.

The server device 50 according to the second embodiment may be configured to include one or more VMs 51, a HV 52, and a virtual switch (VSW) 57.

The VM 51 is a virtual machine which is executed by hardware resources of the server device 50, and is connected to another VM 51 or a storage 60 through a VLAN in the information processing system.

The VSW 57 is a virtual switch which relays information which is transferred between the VMs 51 in the server device 50.

The HV (controller) 52 is a hypervisor which controls the VM 51 in the server device 50. The HV 52 according to the second embodiment includes a test controller 53, a communication confirmation unit 54, a communication result retaining unit 55, and a result informing unit 56 as depicted in FIG. 26.

When receiving an instruction for execution of the communication test and information related to a target device of the communication test from the test execution controller 22, the test controller 53 informs the communication confirmation unit 54 of the connection destination IP address and executes the communication test.

The communication confirmation unit 54 issues a Ping as an example of the communication test to the connection destination IP address received from the test controller 53, and performs the communication test. For example, the communication confirmation unit 54 generates and transmits arbitrary test packets which do not hinder the communication in the VLAN to the connection destination IP address, and measures the number of received packets which are received as a response and the number of lost packets or measure a response time. In addition, the communication confirmation unit 54 generates a communication result table T9 as a communication test result and stores the table in the communication result retaining unit 55.

The communication result retaining unit 55 retains the communication result table T9 as a result of the communication test which is performed by the communication confirmation unit 54, and is realized by, for example, the memory 71e or the storage unit 73e of the server device 50.

When the communication test which is performed by the communication confirmation unit 54 is terminated, the result informing unit 56 transmits, as a communication test result, the communication result table T9 which is retained in the communication result retaining unit 55 to the test execution controller 22. The result informing unit 56 may inform the test execution controller 22 of the termination of the communication test to allow the test execution controller 22 to refer to the communication result table T9 which is retained in the communication result retaining unit 55.

The one or more VMs 51, HV 52, and VSW 57 may be realized when the CPU 70e deploys and executes a predetermined program in the memory 71e.

(2-4) Example of Operation

Figure 27:
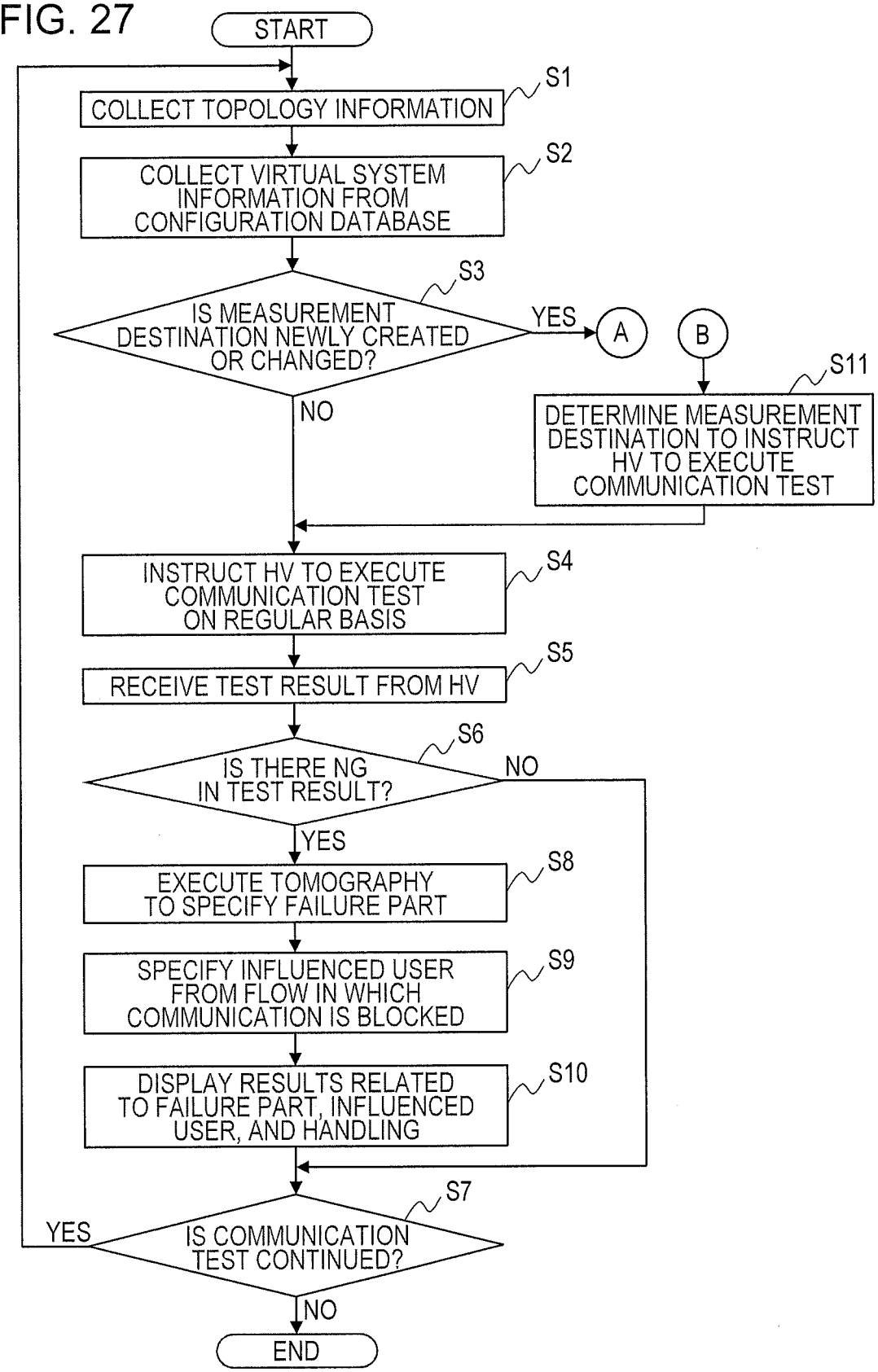
FIG. 27 is a diagram illustrating an example of an operational flowchart for a monitoring device, according to a second embodiment.
Figure 28:
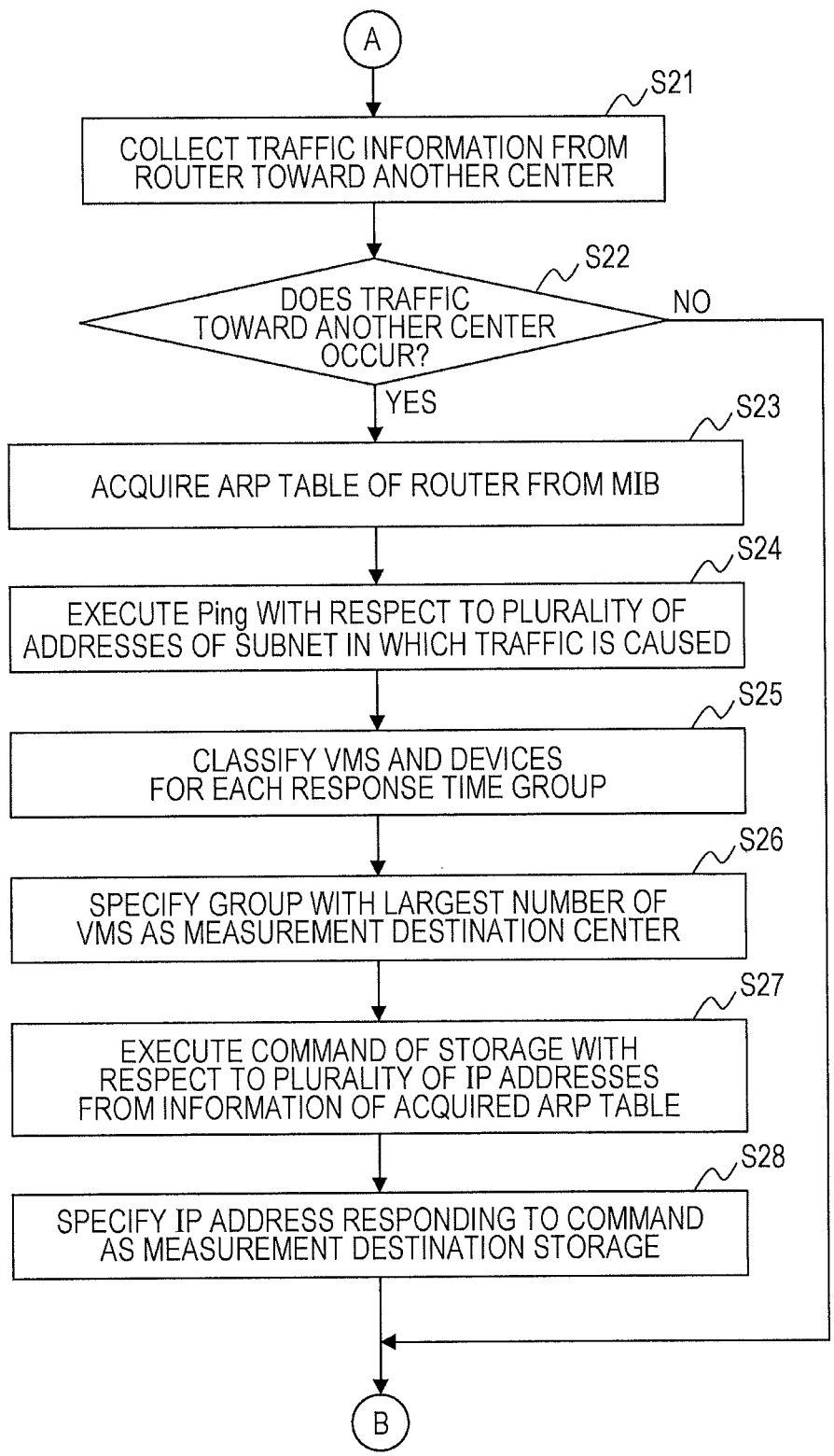
FIG. 28 is a diagram illustrating an example of an operational flowchart for a monitoring device, according to a second embodiment.

Next, an example of an operation of the monitoring device 20 according to the second embodiment configured as described above will be described with reference to FIGS. 27 and 28. FIGS. 27 and 28 are diagrams each illustrating an example of an operational flowchart for the monitoring device 20, according to the second embodiment.

As depicted in FIG. 27, first, the topology information acquiring unit 213 of the monitoring device 20 acquires, as topology information, connection information (and an IP address) related to a monitoring target device through a MIB (step S1). Examples of the monitoring target device include the devices 30 to 60 when the monitoring device 20 also monitors network devices.

In addition, the connection destination information acquiring unit 211 collects information (virtual system information) related to the accommodation relationship of the VM 51 made by the server device 50 (HV 52), on a regular basis, from the configuration database of the management device 10 (step S2).

The another center storage information acquiring unit 212 determines whether there is a change or addition of a new server device 50 (HV 52) which is a measurement target of the communication test on the basis of the information acquired in step S2 (step S3).

When it is determined that there is no change or addition of a new server device 50 (HV 52) (No in step S3), the test execution controller 22 instructs an arbitrary HV 52 in the own center to execute the communication test (step S4). The communication test in step S4 is performed by the connection destination information acquiring unit 211 with respect to the connection destination IP address in the connection destination information management table T6 generated (updated) on the basis of the information collected in step S2.

When the communication test performed by the HV 52 is terminated, the test execution controller 22 receives the communication result table T9 as a test result from the HV 52 (step S5), and stores the table in the test result retaining unit 23.

The processes in steps S4 and S5 are executed on a regular basis.

Next, the failure part determination unit 24 determines whether there is NG in the test result, that is, whether a failure occurs (step S6). When it is determined that there is no NG in the test result (No in step S6), the monitoring device 20 determines whether to continue the communication test (step S7). When the monitoring device 20 determines that the communication test will be continued (Yes in step S7), the process proceeds to step S1. On the other hand, when the monitoring device 20 determines that the communication test will not be continued since a load in the own center is large or there is an instruction input from a manager (No in step S7), the process is terminated.

In step S6, when it is determined that there is NG in the test result (Yes in step S6), the failure part determination unit 24 executes topology analysis on the basis of the test result and the topology information collected in step S1 to specify a failure part (step S8). The failure part determination unit 24 specifies a user who is influenced by the failure from a flow of which the test result corresponds to NG, that is, a flow in which the HV 52 may not confirm the communication (step S9) in step S4.

The display processor 25 outputs (displays), as a result of the monitoring by the monitoring device 20, information related to the specified failure part, the user who is influenced by the failure, and the handling of the failure, to the input and output unit 74b or the like (step S10), and the process proceeds to step S7.

In step S3, when the another center storage information acquiring unit 212 determines that there is a change or addition of a new server device 50 (HV 52) (Yes in step S3), the process proceeds to step S21 of FIG. 28.

In step S21 of FIG. 28, the traffic monitoring unit 212a collects a traffic table T3 from the router 40 toward another center.

The traffic monitoring unit 212a determines whether there is a subnet (for example, a VLAN) in which traffic toward another center is caused (step S22). When the traffic monitoring unit 212a determines that there is no subnet in which traffic toward another center is caused (No in step S22), the process proceeds to step S11 of FIG. 27. That is, in step S11, the connection destination information acquiring unit 211 determines a measurement destination including the server device 50 (HV 52) determined to be added or changed in step S3, and generates a connection destination information management table T6, and the process proceeds to step S4.

Returning to FIG. 28, in step S22, when the traffic monitoring unit 212a determines that there is a subnet in which traffic toward another center is caused (Yes in step S22), the process proceeds to step S23. In step S23, the ARP information acquiring unit 212b acquires, from the MIB, an ARP table T2 of the router 40 related to the subnet in which traffic is caused (step S23).

The center determination unit 212d instructs an arbitrary HV 52 in the own center to execute communication confirmation (for example, Ping) on the subnet in which traffic is caused with respect to a plurality of addressed acquired by the ARP information acquiring unit 212b (step S24).

The center determination unit 212d classifies the plurality of addresses of the VMs 51 and the storage 60 into, for example, groups having similar response times on the basis of the communication confirmation results (step S25). The center determination unit 212d specifies a group with the largest number of VMs as a measurement destination center (step S26).

Furthermore, the storage determination unit 212c instructs an arbitrary HV 52 in the own center to execute a command which is to be responded by the storage 60 with respect to the plurality of addresses on the basis of the information of the ARP table T2 acquired by the ARP information acquiring unit 212b (step S27). The storage determination unit 212c specifies an IP address responding to the command transmitted in step S27 as the measurement destination storage 60 (step S28), and the process proceeds to step S11 of FIG. 27.

As described above, the monitoring device 20 performs the process of detecting a failure part in the own center.

The process in step S1 may be performed at any time as long as it is performed before step S8. In addition, the process in step S21 may be performed when the traffic monitoring unit 212a detects the addition of a new VM 51 in step S2, or, for example, may be executed before step S3. The process in step S21 may be executed at regular times.

Once informing the HV 52 of the measurement destination, the test execution controller 22 may not inform the HV 52 of the measurement destination when executing step S4 via the No route of step S3. In this case, the HV 52 confirms communication on a regular basis with respect to the measurement destination informed once. When executing step S4 via the Yes route of step S3 and step S11, the test execution controller 22 updates the measurement destination of the communication test and informs the HV 52 of the updated information.

Furthermore, when the information processing system includes only two centers, the monitoring device 20 may omit the processes in steps S24 to S26 of FIG. 28.

(2-5) Conclusion

As described above, the monitoring device 20 of the first center 1 according to the second embodiment determines whether one or more destination addresses which are transmitted from the router 40 to the outside of the first center 1 include the address of the storage 60-2 of the second center 2. The monitoring device 20 causes any one server device 50 among the server devices 50-1 to 50-3 to execute the communication test with respect to the address of the storage 60-2 subjected to the determination. Accordingly, the monitoring device 20 is able to monitor the storage 60-2 of the second center 2 which is influenced by the operation of the first center 1 in the first center 1.

In this manner, the monitoring device 20 according to the second embodiment is configured to specify a measurement target storage 60 of another center and perform the communication test even when a VM is moved from another center, and as a result, the failure part and the VM which is influenced may be specified without omission.

In addition, the monitoring device 20 according to the second embodiment causes the HV 52 of one server device 50 to execute the communication test with respect to the address of the storage 60-2 subjected to the determination. Accordingly, as described above, the monitoring device 20 is able to perform the communication test without using as much as possible user's resources and is able to reduce the processing load of the information processing system, as compared with the case in which the VM executes the communication test.

Furthermore, when recognizing the addition of a VM 51 to the server device 50, the monitoring device 20 according to the second embodiment determines whether there is transmission of information from the router 40 to the virtual network to which the added VM 50 belongs. When determining that there is transmission of information, the monitoring device 20 determines whether one or more destination addresses of the information, retained in the router 40, which is transmitted to the virtual network, include the address of the storage 60-2. Accordingly, since the monitoring device 20 recognizes new access to the outside after the addition of the VM 50 as a trigger of the process of specifying the storage 60-2, the storage 60-2 may be securely specified.

In addition, the monitoring device 20 according to the second embodiment transmits a command to which the storage 60 is to respond, to each of one or more destination addresses acquired from the router 40, to determine a destination address responding thereto as the address of the storage 60. Accordingly, the monitoring device 20 may securely specify the storage 60-2.

Furthermore, when acquiring two or more destination addresses from the router 40, the monitoring device 20 according to the second embodiment groups the two or more destination addresses on the basis of the results of the communication confirmation with respect to the two or more destination addresses. The monitoring device 20 determines whether one or more destination addresses of the group selected from a plurality of the groups obtained by the grouping on the basis of predetermined conditions include the address of the storage 60. Accordingly, as described above, when there are, for example, three or more centers, the monitoring device 20 may easily narrow measurement target centers of the communication test and specify the storage 60-2. Accordingly, the monitoring device 20 may suppress an increase in the processing load of the entire information processing system and reduce an increase in the communication amount in the own center and between the own center and each of the plurality of centers.

In addition, the predetermined condition includes at least one of a short response time with respect to the communication confirmation and a large number of addresses. Accordingly, the monitoring device 20 may select an appropriate measurement target center when there are, for example, three or more centers.

Furthermore, the monitoring device 20 according to the second embodiment causes the server device 50 of the first center 1 to execute the communication test with respect to the devices in the first center 1 and the storage 60 of the second center 2 which has an influence on the server device 50 of the first center 1. Accordingly, since the monitoring device 20 is able to collectively monitor the range having an influence on the operation of the first center 1 from the resources over the plurality of centers, the monitoring device has a high level of convenience.

In addition, the monitoring device 20 according to the second embodiment detects a failure in the first center 1, resulting from the failure in a route up to the storage 60-2 of the second center 2, and determines a failure part, on the basis of the results obtained by executing the communication test. Accordingly, since the monitoring device 20 is able to collectively detect the occurrence of a failure and a failure part with respect to the range having an influence on the operation of the first center 1 from the resources over the plurality of centers, the monitoring device has a high level of convenience.

In many cases, a VM 51 which is used by a user has a limit, from the viewpoint of security, in acquiring MIB information which is retained in the router 40 and address information of VMs 51 and a storage 60 of another center. However, the first and second embodiments focus on a situation in which the monitoring device 20 which is operated by a manager of the center or the like is able to collect the above-described various information from the devices in the own center. From the viewpoint of this, the monitoring device 20 according to the first and second embodiments specifies the address information of the VMs 51 and the storage 60 of another center using the above-described method on the basis of information collected from the devices in the own center.

(3) Others

Although the preferred embodiments have been described in detail, these are not limited to the specific related embodiments and various changes and alterations may be made hereto without departing from the spirit and scope of the embodiments.

Figure 29:
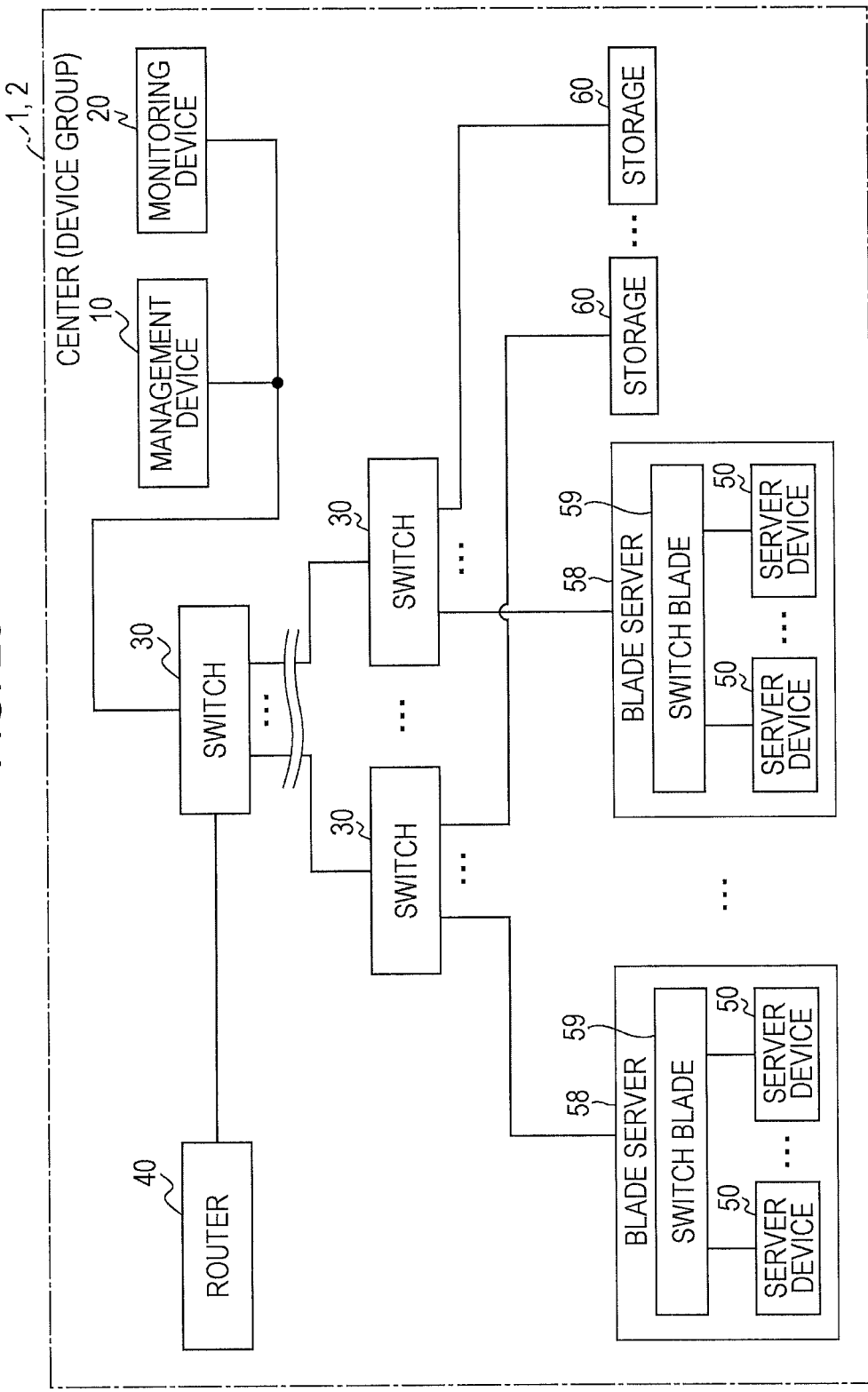
FIG. 29 is a diagram illustrating another example of configurations of centers, according to an embodiment.

For example, the configurations of the devices 30 to 60 and the number of devices in the first center (first device group) 1 and the second center (second device group) 2 according to the first and second embodiments are not limited to those depicted in FIG. 1 or 2. For example, at least one of the first center (first device group) 1 and the second center (second device group) 2 may have the configuration depicted in FIG. 29. FIG. 29 is a diagram illustrating another example of the configuration of the centers 1 and 2 depicted in FIG. 2.

As depicted in FIG. 29, the center 1 or 2 may include a plurality of blade servers 58, a plurality of switches 30 connected in multi-stages, and a plurality of storages 60, in addition to the management device 10, the monitoring device 20, and the router 40 depicted in FIG. 2. The blade server 58 accommodates a plurality of server devices 50 as server blades and connects the server devices 50 to each other by a switch blade 59.

Even when at least one of the first center (first device group) 1 and the second center (second device group) 2 has the configuration depicted in FIG. 29, similar effects as those of the first and second embodiments may be obtained.

In addition, the description has been made in which the information processing system according to the first and second embodiments includes two or three centers (device groups). However, the number of the centers is not limited thereto and four or more centers (device groups) may be included. Even when the information processing system includes four or more centers (device groups), similar effects as those of the first and second embodiments may be obtained.

Furthermore, the description has been made in which in the first and second embodiments, the monitoring device 20 is connected to the switch 30 and accesses the devices 10 and 40 to 60 in the own center through the switch 30. However, the configuration is not limited thereto. For example, the monitoring device 20 may be connected to the devices 10 and 40 to 60 in the own center through a dedicated control line such as a LAN cable to acquire a MIB using a SNMP and to transfer a command and data to and from the HV 52 through the control line.

In addition, the description has been made in which the monitoring device 20 according to the second embodiment narrows one or more centers using the center determination unit 212*d* when a storage 60 which may be a measurement target of the communication test is dispersed in a plurality of other centers, but the configuration is not limited thereto.

For example, when a storage 60 which may be a measurement target of the communication test is dispersed in a plurality of other centers, the monitoring device 20 may set the plurality of other centers as measurement targets of the communication test. In this case, the storage determination unit 212*c* may issue a command to which the storage 60 is to respond, to all of the destination IP addresses acquired by the ARP information acquiring unit 212*b*, and specify a plurality of measurement target storages 60 from the plurality of other centers. The another center storage information acquiring unit 212 may omit the function of the center determination unit 212*d*. For example, the processes in steps S24 to 26 of FIG. 28 may be omitted.

Furthermore, in the second embodiment, the description has been made in which one or more subnets such as a VLAN are formed between the first center 1 and the second center 2. However, the configuration is not limited thereto. For example, even when a network such as a VPN which encapsulates and transfers information is formed (set) between the first center 1 and the second center 2, the monitoring device 20 may perform the above-described processes.

In addition, in the second embodiment, the case has been described in which the VM 51 is moved from another center. However, the configuration is not limited thereto. For example, the server device (physical server) 50 itself using the storage 60 of another center may be moved, or a new VM 51 or server device 50 using the storage 60 of another center may be created in the own center.

In addition, in the first and second embodiments, the same subnet as the virtual server to which the storage is moved has been described. However, the embodiments discussed herein are not limited thereto, and storages accommodated in different subnets may also be considered. For example, regarding the ARP table of the router, not only the addresses of the same subnet as the virtual server, but also all of the IP addresses may be collected to set storages of other subnets as monitoring targets.

Some or all of the various functions of the monitoring device 20 and the server device 50 according to an embodiment may be realized when a computer (including a CPU, an information processing device, and various terminals) executes a predetermined program.

The program is provided in the form of being recorded in a computer-readable recording medium (for example, the recording medium 77 depicted in FIG. 3) such as a flexible disk, a CD (CD-ROM, CD-R, CD-RW, and the like), a DVD (DVD-ROM, DVD-RAM, DVD-R, DVD-RW, DVD+R, DVD+RW, and the like), and Blu-ray disc. In this case, the computer reads a program from the recording medium to transfer and store the program in an internal storage device or an external storage device.

Here, the computer is a concept including hardware and an operating system (OS), and means hardware which is operated under the control of the OS. When the OS is not used and the hardware is operated only with an application program, the hardware itself corresponds to the computer. The hardware includes at least a microprocessor such as a CPU and a unit which reads a computer program recorded in a recording medium. The program includes program codes which realize the various functions of the monitoring device and the server device 50 according to an embodiment in the above-described computer. Some of the functions may be realized through the OS, not through the application program.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An apparatus for specifying a failure part in a first device group including a plurality of information processing devices and a relay device relaying access of the plurality of information processing devices, the apparatus comprising:
   a hardware processor configured:
      to determine whether one or more destination addresses of information transmitted from the relay device to outside of the first device group, include a first address assigned to a storage device included in a second device group, the second device group being connected to the first device group through the relay device, the storage device being a destination of access of at least one of the plurality of information processing devices; and
      to cause one of the plurality of information processing devices to execute a communication test with respect to the first address of the storage device.

2. The apparatus of claim 1, wherein
   the hardware processor causes a controller provided for the one information processing device and configured to control one or more virtual machines, to execute a communication test with respect to the first address of the storage device.

3. The apparatus of claim 2, wherein
   the relay device and another relay device included in the second device group form one or more virtual networks, and the first device group and the second device group are connected by the one or more virtual networks;
   upon recognizing that a virtual machine has been added to at least one of the plurality of information processing devices, the hardware processor determines whether there is transmission of information from the relay device to the virtual network to which the added virtual machine belongs; and when determining that there is transmission of the information, the hardware processor determines whether one or more destination addresses of information that have been transmitted to the virtual network and are retained in the relay device include the first address of the storage device.

4. The apparatus of claim 3, wherein the hardware processor is configured to acquire, from a management device that manages the virtual machine and the controller provided for each of the plurality of information processing devices, second addresses assigned to a plurality of the controllers, and the hardware processor causes the controller provided for the one information processing device to execute a communication test with respect to the first address and the second addresses.

5. The apparatus of claim 1, wherein the hardware processor transmits a command to which the storage device is to respond to the one or more destination addresses acquired from the relay device, and determines a destination address responding thereto as the first address of the storage device.

6. The apparatus of claim 1, wherein when acquiring two or more destination addresses, as the one or more destination addresses, from the relay device, the hardware processor groups the two or more destination addresses into a plurality of groups on the basis of results of the communication tests with respect to the two or more destination addresses, and determines whether one or more destination addresses of one or more groups that have been selected from the plurality of groups on the basis of a predetermined condition, include the first address of the storage device.

7. The apparatus of claim 6, wherein the predetermined condition is at least one of a first condition that a response time for the communication test is less than a predetermined time and a second condition that a number of addresses is greater than a predetermined value.

8. The apparatus of claim 1, wherein the hardware processor is configured:

to acquire information indicating connection relationships between devices provided for the first device group, to detect a first failure in the first device group, resulting from a second failure in a route up to the storage device, on the basis of the result obtained by executing the communication test, and to determine a failure part on the basis of the information indicating the connection relationships between the devices when the first failure is detected.

9. A system comprising:

a first device group including a plurality of information processing devices, a first relay device for relaying access of the plurality of information processing devices, and a monitoring device for specifying a failure part in the first device group; and a second device group, connected to the first device group through the first relay device, including a storage device, wherein the monitoring device includes:

a determination unit configured to determine whether one or more destination addresses of information which is transmitted from the first relay device to outside of the first device group, include a first address of the storage device which is a destination of access of at least one of the plurality of information processing devices; and a test controller configured to cause one of the plurality of information processing devices to execute a communication test with respect to the first address of the storage device.

10. The system of claim 9, wherein the one information processing device includes one or more virtual machines and a controller for controlling the one or more virtual machines; and the test controller causes the controller of the one information processing device to execute a communication test with respect to the first address of the storage device.

11. The system of claim 10, wherein the second device group includes a second relay device;

the first and second relay devices form one or more virtual networks, and the first and second device groups are connected via the one or more virtual networks;

upon recognizing that a virtual machine has been added to at least one of the plurality of information processing devices, the determination unit determines whether there is transmission of information from the first relay device to one of the one or more virtual networks to which the added virtual machine belongs; and upon determining that there is transmission of the information, the determination unit determines whether one or more destination addresses of the information that have been transmitted to the virtual network and retained in the first relay device, include the first address of the storage device.

12. The system of claim 9, wherein the determination unit transmits a command to which the storage device is to respond, to the one or more destination addresses acquired from the first relay device, and determines a destination address responding thereto as the first address of the storage device.

13. A method for specifying a failure part in a first device group including a plurality of information processing devices and a relay device relaying access of the plurality of information processing devices, the method comprising:

determining whether one or more destination addresses of information transmitted from the relay device to outside of the first device group, include a first address of a storage device included in a second device group that is connected to the first device group through the relay device, the storage device being a destination of access of at least one of the plurality of information processing devices; and causing one of the plurality of information processing devices to execute a communication test with respect to the first address of the storage device.

14. The method of claim 13, wherein a controller that is provided for the one information processing device and configured to control one or more virtual machines is caused to execute the communication test.

15. The method of claim 14, wherein the relay device and another relay device included in the second device group form one or more virtual networks via which the first and second device groups are connected; and the determining is performed when, upon recognizing the addition of a virtual machine to at least one of the plurality of information processing devices, it is determined that there is transmission of information from the relay device to one of the one or more virtual networks to which the added virtual machine belongs.

16. The method of claim 13, wherein
the determining includes transmitting a command to which the storage device is to respond, to each of the one or more destination addresses acquired from the relay device, and determining a destination address responding thereto as the first address of the storage device.

17. A non-transitory computer-readable recording medium having stored therein a program for causing a computer to execute a process, the computer specifying a failure part in a first device group including a plurality of information processing devices and a relay device relaying access of the plurality of information processing devices, the process comprising:
determining whether one or more destination addresses of information transmitted from the relay device to outside of the first device group, include a first address of a storage device included in a second device group that is connected to the first device group through the relay device, the storage device being a destination of access of at least one of the plurality of information processing devices; and
causing one of the plurality of information processing devices to execute a communication test with respect to the first address of the storage device.

18. The non-transitory computer-readable recording medium of claim 17, wherein
a controller that is provided for the one information processing device and configured to control one or more virtual machines is caused to execute the communication test.

19. The non-transitory computer-readable recording medium of claim 18, wherein
the relay device and another relay device included in the second device group form one or more virtual networks via which the first and second device groups are connected; and
the determining is performed when, upon recognizing the addition of a virtual machine to at least one of the plurality of information processing devices, it is determined that there is transmission of information from the relay device to one of the one or more virtual networks to which the added virtual machine belongs.

20. The non-transitory computer-readable recording medium of claim 17, wherein
the determining includes transmitting a command to which the storage device is to respond, to each of the one or more destination addresses acquired from the relay device, and determining a destination address responding thereto as the first address of the storage device.

21. A monitoring device for specifying a failure part in a first device group including a plurality of information processing devices and a relay device relaying access of the plurality of information processing devices, comprising:
a processor configured:
to determine whether one or more destination addresses of information which is transmitted from the relay device to outside of the first device group, include an address of a storage device of a second device group connected to the first device group through the relay device, the storage device being a destination of the access of at least one of the plurality of information processing devices, and
to cause one of the plurality of information processing devices to execute a communication test with respect to the address of the storage device.

* * * * *